United States Patent
He et al.

(10) Patent No.: US 11,553,206 B2
(45) Date of Patent: Jan. 10, 2023

(54) BL-PREDICTION FOR VIDEO CODING

(71) Applicant: VID SCALE, INC., Wilmington, DE (US)

(72) Inventors: Yuwen He, San Diego, CA (US); Jiancong Luo, Skillman, NJ (US); Xiaoyu Xiu, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 17/280,175

(22) PCT Filed: Sep. 26, 2019

(86) PCT No.: PCT/US2019/053088
§ 371 (c)(1),
(2) Date: Mar. 25, 2021

(87) PCT Pub. No.: WO2020/069076
PCT Pub. Date: Apr. 2, 2020

(65) Prior Publication Data
US 2022/0007048 A1    Jan. 6, 2022

Related U.S. Application Data

(60) Provisional application No. 62/786,641, filed on Dec. 31, 2018, provisional application No. 62/736,790, filed on Sep. 26, 2018.

(51) Int. Cl.
*H04N 19/577* (2014.01)
(52) U.S. Cl.
CPC ................................. *H04N 19/577* (2014.11)

(58) Field of Classification Search
CPC .................................................. H04N 19/577
See application file for complete search history.

(56) References Cited

U.S. PATENT DOCUMENTS

| 2018/0184117 | A1 | 6/2018 | Chen et al. |
| 2018/0192072 | A1* | 7/2018 | Chen .................... H04N 19/513 |
| 2020/0366928 | A1* | 11/2020 | Liu ........................ H04N 19/52 |

FOREIGN PATENT DOCUMENTS

EP          3273692  A1    1/2018

OTHER PUBLICATIONS

English PCT/CN/2018089919 Jun. 5, 2018.*
(Continued)

*Primary Examiner* — Mohammed S Rahaman
(74) *Attorney, Agent, or Firm* — Condo Roccia Koptiw LLP

(57) ABSTRACT

Systems, methods, and instrumentalities may be provided for determining whether to bypass bi-directional optical flow (BDOF) if BDOF is used in combination with bi-prediction with coding unit (CU) weights (e.g., generalized bi-prediction (GBi)). A coding system may combine coding modes, coding techniques, and/or coding tools. The coding system may include a wireless transmit/receive unit (WTRU). For example, the coding system may combine BDOF and bi-prediction with GU weights (BCW). BDOF may include refining a motion vector associated with a current CU based at least in part on gradients associated with a location in the current CU. The coding system may determine that BDOF is enabled, and/or that bi-prediction with CU weights is enabled for the current CU. The coding system's determination that bi-prediction with CU weights is enabled and/or that BDOF is enabled may be based on one or more indications.

20 Claims, 15 Drawing Sheets

(56) References Cited

OTHER PUBLICATIONS

Xiu et al., "CE9-Related: A Simplified Bi-Directional Optical Flow (BIO) Design based on the Combination of CE9.5.2 Test 1 and CE9.5.3", JVET-K0485-V1, InterDigital Communications, Inc., MediaTek Inc., Joint Video Experts Team (JVET) of ITU-T SG 16 WP 3 and ISO/IEC JTC 1/SC 29/WG 11, 11th Meeting: Ljubljana, SI.*

Chen Chun-Chi et al: Generalized bi-prediction method for future video coding ,2016 Picture Coding Symposium (PCS), IEEE, Dec. 4, 2016D2: p. 3, left column last three paragraphs.*

"BMS-2.0 Reference Software", Available at <https://vcgit.hhi.fraunhofer.de/jvet/VVCSoftware_BMS/tags/BMS-2.1rc1>, 1 page.

"HM Reference Software HM-16.9", Available at <https://hevc.hhi.fraunhofer.de/svn/svn_HEVCSoftware>, Mar. 2016, 1 page.

"JEM-7.0 Reference Software", Available at <https://jvet.hhi.fraunhofer.de/svn/svn_HMJEMSoftware/tags/HM-16.6-JEM-7.0>, 1 page.

"VTM-2.0.1 Reference Software", Available at <https://vcgit.hhi.fraunhofer.de/jvet/VVCSoftware_VTM/tags/VTM-2.0.1>, 1 page.

Bossen et al., "JVET Common Test Conditions and Software Reference Configurations for SDR Video", JVET-K1010, Joint Video Experts Team (JVET) of ITU-T SG 16 WP 3 and ISO/IEC JTC 1/SC 29/WG 11 11th Meeting: Ljubljana, SI, Jul. 10-18, 2018, 6 pages.

Bross et al., "High Efficiency Video Coding (HEVC) Text Specification Draft 10 (for FDIS & Consent)", JCTVC-L1003_V1, Editor, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.

Bross, Benjamin, "Versatile Video Coding (Draft 1)", JVET-J1001-V2, Editor, Joint Video Experts Team (JVET) of ITU-T SG 16 WP 3 and ISO/IEC JTC 1/SC 29/WG 11, 10th Meeting: San Diego, USA, Apr. 10-20, 2018, 40 pages.

Bross et al., "Versatile Video Coding (Draft 3)", JVET-L1001-V7, Editors, Joint Video Experts Team (JVET) of ITU-T SG 16 WP 3 and ISO/IEC JTC 1/SC 29/WG 11, 12th Meeting: Macao, CN, Oct. 3-12, 2018, 223 pages.

Chen et al., "Algorithm Description for Versatile Video Coding and Test Model 6 (VTM 6)", JVET-O2002-V2, Editors, Joint Video Experts Team, (JVET) of ITU-T SG 16 WP 3 and ISO/IEC JTC 1/SC 29/WG 11, 15th Meeting: Gothenburg, SE, Jul. 3-12, 2019, 87 pages.

Chen et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.

Chen et al., "Generalized Bi-Prediction for Inter Coding", JVET-C0047, InterDigital Communications, Inc., Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-4.

Chen et al., "Generalized Bi-Prediction Method for Future Video Coding", IEEE 2016 Picture Coding Symposium (PCS), Dec. 2016, 5 pages.

ITU-T, "Advanced Video Coding for Generic Audiovisual Services", ITU-T Recommendation H.264, Series H: Audiovisual and Multimedia Systems Infrastructure of Audiovisual Services—Coding of Moving Video, Nov. 2007, 563 pages.

Liu et al., "CE9-Related: Disabling DMVR and BDOF when Underlying Assumptions are False", JVET-N0440, Bytedance Inc., Joint Video Experts Team (JVET) of ITU-T SG 16 WP 3 and ISO/IEC JTC 1/SC 29/WG 11, 14th Meeting: Geneva, CH, Mar. 19-27, 2019, 2 pages.

Liu et al., "Local Illumination Compensation", VCEG-AZ06, Qualcomm Incorporated, ITU—Telecommunications Standardization Sector Study Group 16 Question 6 Video Coding Experts Group (VCEG), 52nd Meeting: Warsaw, Poland, Jun. 19-26, 2015, 4 pages.

Segall et al., "Joint Call for Proposals on Video Compression with Capability beyond HEVC", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.

SMPTE, "VC-1 Compressed Video Bitstream Format and Decoding Process", SMPTE 421M, Apr. 2006, 493 pages.

Su et al., "CE4.4.1: Generalized Bi-Prediction for Inter Coding", JVET-K0248-V1, MediaTek Inc., Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-4.

Su et al., "CE4-Related: Generalized Bi-Prediction Improvements", JVET-L0197, MediaTek Inc., Joint Video Experts Team (JVET) of ITU-T SG 16 WP 3 and ISO/IEC JTC 1/SC 29/WG 11, 12th Meeting: Macao, CN, Oct. 3-12, 2018, pp. 1-3.

Suhring et al., "H.264/14496-10 AVC Reference Software Manual (Revised for JM 19.0)", JVT-AE010, Apple Inc., Fraunhofer HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Available at <http://iphome.hhi.de/suehring/tml/download/jm16.1.zip>, Jun. 28-Jul. 3, 2009, 98 pages.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Wikipedia, "Sobel Filter", Available at <https://en.wikipedia.org/wiki/Sobel_operator>, Feb. 20, 2021, pp. 1-8.

Xiu et al., "CE9-Related: A Simplified Bi-Directional Optical Flow (BIO) Design based on the Combination of CE9.5.2 Test 1 and CE9.5.3", JVET-K0485-V1, InterDigital Communications, Inc., MediaTek Inc., Joint Video Experts Team (JVET) of ITU-T SG 16 WP 3 and ISO/IEC JTC 1/SC 29/WG 11, 11th Meeting: Ljubljana, SI, Jul. 10-18, 2018, 3 pages.

* cited by examiner

BI-PREDICTION FOR VIDEO CODING

CROSS-REFERENCE TO RELATED CASES

The present application is the National Stage Entry under 35 U.S.C. § 371 of Patent Cooperation Treaty Application No. PCT/US2019/053088, filed Sep. 26, 2019, which claims the benefit of U.S. Provisional Patent Application No. 62/736,790 filed Sep. 26, 2018 and U.S. Provisional Patent Application No. 62/786,641, filed Dec. 31, 2018, the contents of which are hereby incorporated by reference in their entireties.

BACKGROUND

Video coding systems may be used to compress digital video signals, e.g., to reduce the storage and/or transmission bandwidth used for such signals. Video coding systems may include block-based, wavelet-based, and/or object-based systems. The systems employ video coding techniques, such as bi-directional motion compensated prediction (MCP), which may remove temporal redundancies by exploiting temporal correlations between pictures. Some techniques may increase the complexity of computations performed during encoding and/or decoding.

SUMMARY

Systems, methods, and instrumentalities may be provided for determining whether to bypass bi-directional optical flow (BDOF) if BDOF is used in combination with bi-prediction with coding unit (CU) weights (e.g., generalized bi-prediction (GBi)). A coding system may combine coding modes, coding techniques, and/or coding tools. The coding system may include a wireless transmit/receive unit (WTRU). For example, the coding system may combine BDOF and bi-prediction with CU weights (BCW). BDOF may include refining a motion vector associated with a current CU based at least in part on gradients associated with a location in the current CU. The coding system may determine that BDOF is enabled, and/or that bi-prediction with CU weights is enabled for the current CU. The coding system's determination that bi-prediction with CU weights is enabled and/or that BDOF is enabled may be based on one or more indications.

The coding system may determine whether to perform or bypass BDOF based on weights of bi-prediction with CU weights. In an example, the coding system may identify a weight indication of bi-prediction with CU weights for the current CU. The weight indication may indicate weights to be used for the current CU in bi-prediction with CU weights. The coding system may determine whether to bypass BDOF for the current CU based at least in part on the weight indication of bi-prediction with CU weights for the current CU. If the weight indication indicates that unequal weights are to be used for the current CU in bi-prediction with CU weights, the coding system may determine to bypass BDOF for the current CU. To reconstruct the current CU, the coding system may perform bi-prediction with CU weights without BDOF based on the determination to bypass BDOF. If the weight indication indicates that equal weights are to be used for the current CU in bi-prediction with CU weights, the coding system may determine whether to perform BDOF for the current CU.

In an example, the weight indication may indicate that unequal weights are to be used for the current CU in bi-prediction with CU weights. The coding system may derive a prediction CU weight. For example, the coding system may determine a first prediction CU weight based on the weight indication of bi-prediction with CU weights. The coding system may derive a second prediction CU weight based on the first prediction CU weight and a constraint associated with bi-prediction with CU weights. The coding system may perform bi-prediction with CU weights based on the first prediction CU weight and the second prediction CU weight. The weight indication of bi-prediction with CU weights may include an index value. The index value may correspond to a predetermined weight. Different index values may indicate different predetermined weights.

DETAILED DESCRIPTION

Figure 1A:
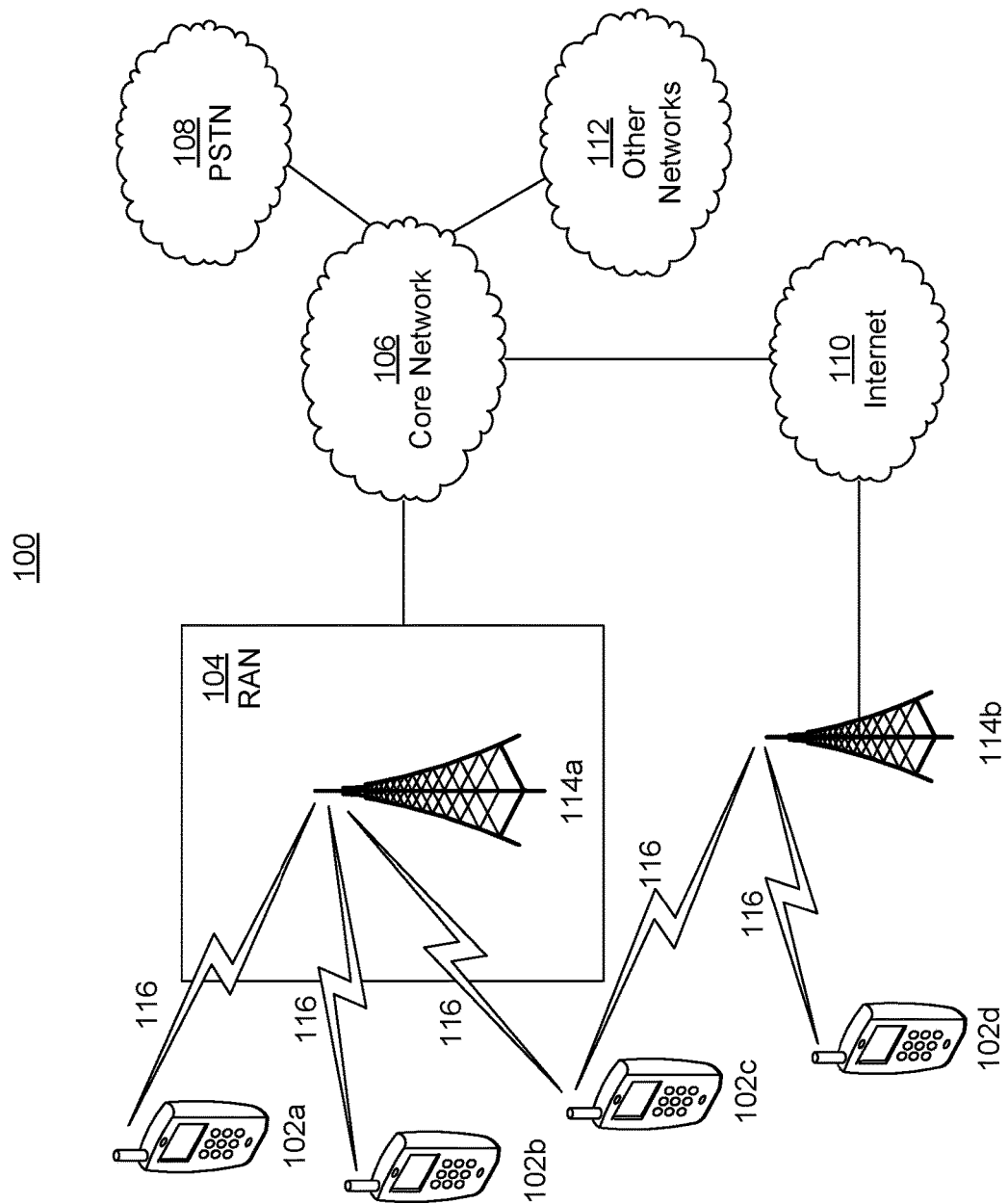
FIG. 1A is a system diagram illustrating an example communications system.

FIG. 1A is a diagram illustrating an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed examples may contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an example, the base station 114a may include three transceivers, i.e., one for each sector of the cell. In an example, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an example, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an example, the base station 114a and the WTRUs 102a, 102b, 102c may implement a radio technology such as NR Radio Access, which may establish the air interface 116 using New Radio (NR).

In an example, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In examples, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point for example, and may utilize any suitable RAT for facilitating wireless connectivity in a localized area, such as a place of business, a home, a vehicle, a campus, an industrial facility, an air corridor (e.g., for use by drones), a roadway, and the like. In an example, the base station 114b and the WTRUs 102c, 102d may implement a radio technology such as IEEE 802.11 to establish a wireless local area network (WLAN). In an example, the base station 114b and the WTRUs 102c, 102d may implement a radio technology such as IEEE 802.15 to establish a wireless personal area network (WPAN). In an example, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
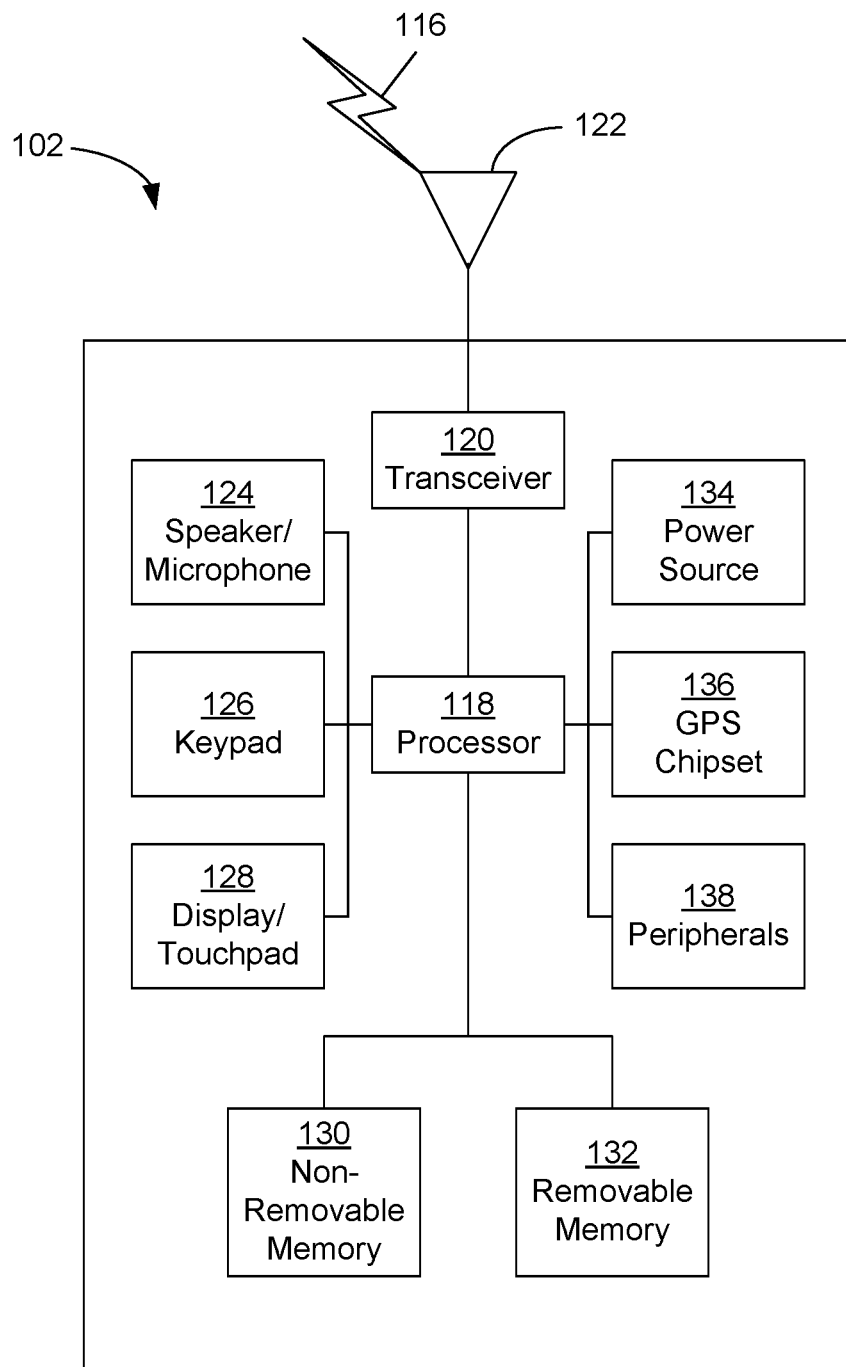
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an example, the transmit/receive element 122 may be an antenna configured to transmit and/or receive RF signals. In an example, the transmit/receive element 122 may be an emitter/detector configured to transmit and/or receive IR, UV, or visible light signals, for example. In an example, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In examples, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an example, the WRTU 102 may include a half-duplex radio for which transmission and reception of some or all of the signals (e.g., associated with particular subframes for either the UL (e.g., for transmission) or the downlink (e.g., for reception)).

Figure 1C:
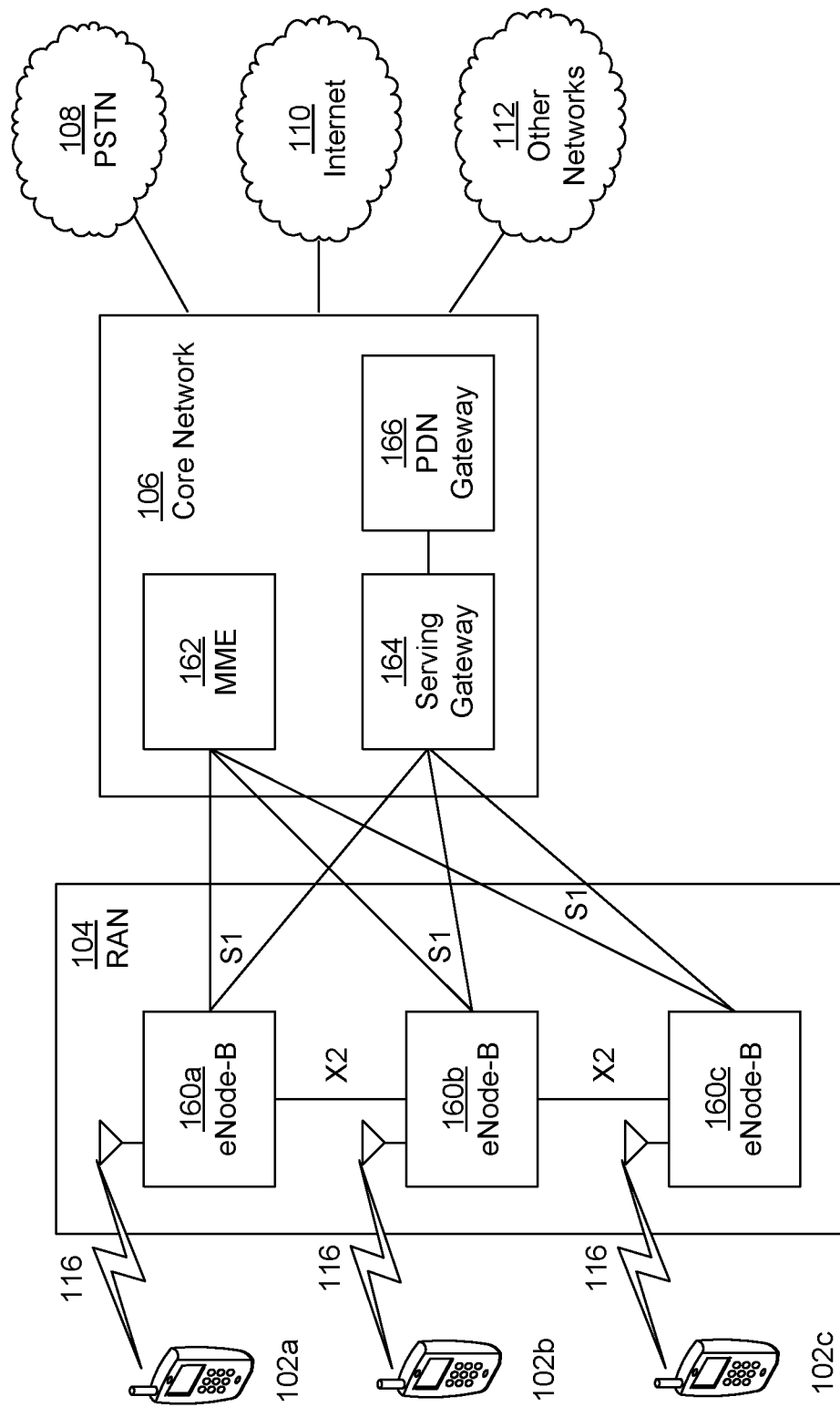
FIG. 1C is a system diagram illustrating an example radio access network (RAN) and an example core network (CN) that may be used within the communications system illustrated in FIG. 1A.

FIG. 1C is a system diagram illustrating an example RAN 104 and the CN 106. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain examples such a terminal may use (e.g., temporarily or permanently) wired communication interfaces with the communication network.

In examples, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS maybe sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In examples, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In examples, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to an example, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
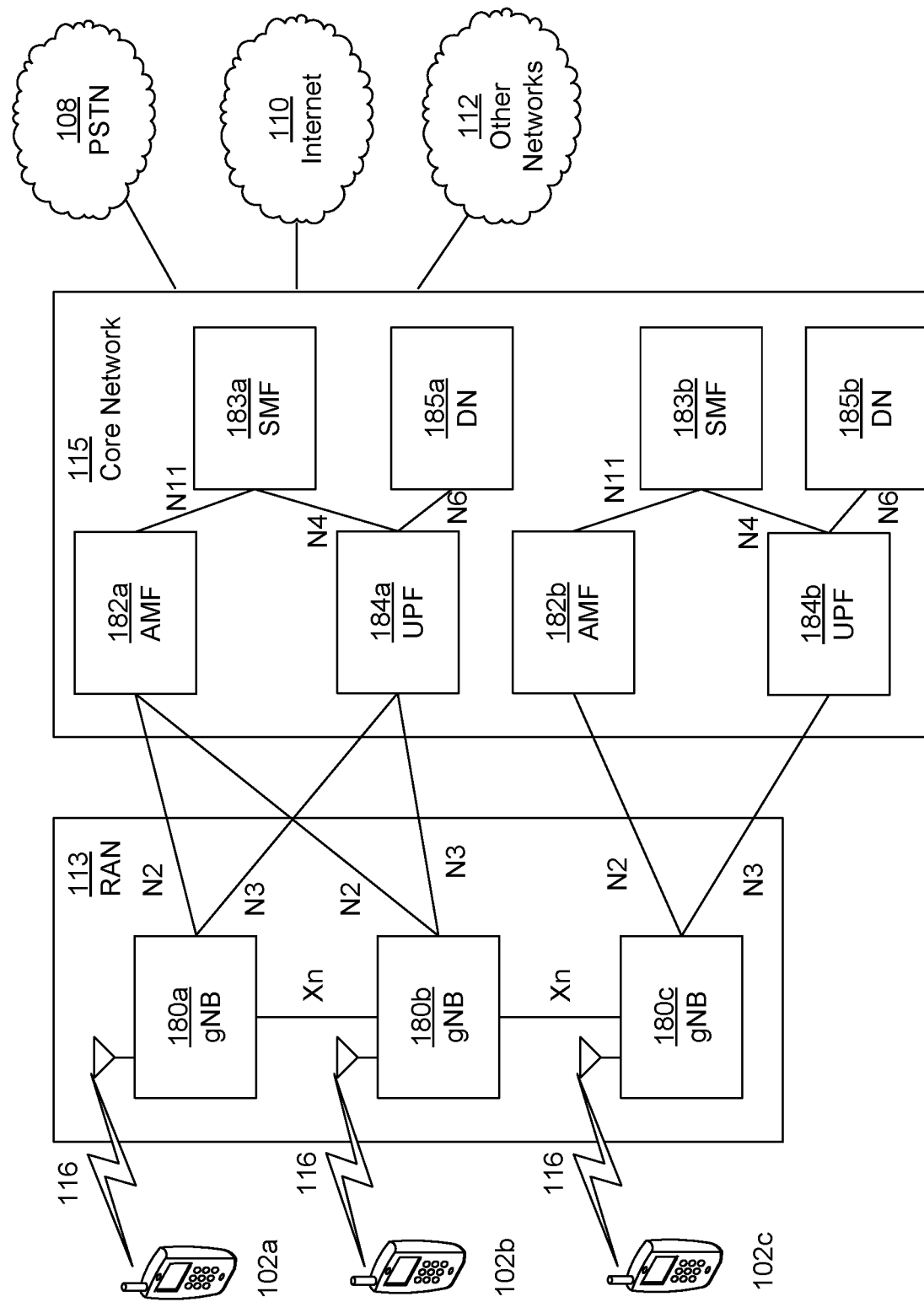
FIG. 1D is a system diagram illustrating a further example RAN and a further example CN that may be used within the communications system illustrated in FIG. 1A.

FIG. 1D is a system diagram illustrating an example RAN 113 and the CN 115. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs. The gNBs 180a, 180b, 180c may each include one or more transceivers for communicating with the WTRUs 102a, 102b, 102c over the air interface 116. In an example, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an example, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an example, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (ON) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an example, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Video coding systems may be used to compress digital video signals, which may reduce the storage needs and/or the transmission bandwidth of video signals. Video coding systems may include block-based, wavelet-based, and/or object-based systems. Block-based video coding systems may include MPEG-1/2/4 part 2, H.264/MPEG-4 part 10 AVC, VC-1, High Efficiency Video Coding (HEVC) and/or Versatile Video Coding (VVC).

Figure 2:
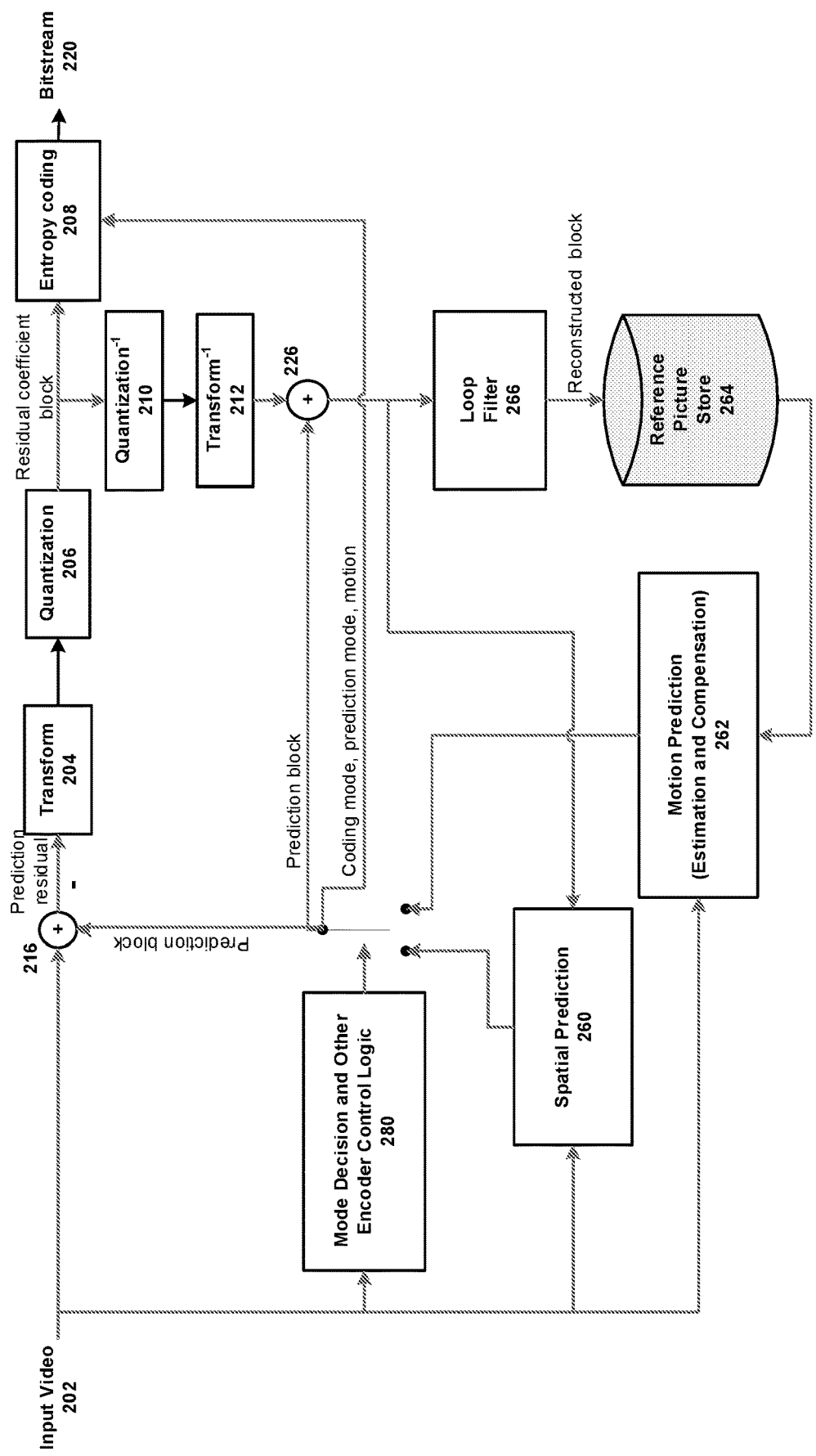
FIG. 2 is a diagram of an example block-based video encoder.

Block-based video coding systems may include a block-based hybrid video coding framework. FIG. 2 illustrates an example block-based hybrid video encoding framework for an encoder. A WTRU may include an encoder. An input video signal 202 may be processed block-by-block. Block sizes (e.g., extended block sizes, such as a coding unit (CU)) may compress high resolution (e.g., 1080p and beyond) video signals. For example, a CU may include 64×64 pixels or more. A CU may be partitioned into prediction units (PUs), and/or separate predictions may be used. For an input video block (e.g., macroblock (MB) and/or a CU), spatial prediction 260 and/or temporal prediction 262 may be performed. Spatial prediction 260 (e.g., intra prediction) may use pixels from samples of coded neighboring blocks (e.g., reference samples) in the video picture/slice to predict the current video block. The spatial prediction 260 may reduce spatial redundancy, for example, that may be inherent in the video signal. Motion prediction 262 (e.g., inter prediction and/or temporal prediction) may use reconstructed pixels from the coded video pictures, for example, to predict the current video block. The motion prediction 262 may reduce temporal redundancy, for example, that may be inherent in the video signal. Motion prediction signals for a video block may be signaled by one or more motion vectors and/or may indicate the amount and/or the direction of motion between the current block and/or the current block's reference block. If multiple reference pictures are supported for a (e.g., each) video block, the video block's reference picture index may be sent. The reference picture index may be used to identify from which reference picture in a reference picture store 264 the motion prediction signal may derive.

After the spatial prediction 260 and/or motion prediction 262, a mode decision block 280 in the encoder may determine a prediction mode (e.g., the best prediction mode), for example, based on a rate-distortion optimization. The prediction block may be subtracted from a current video block 216 and/or the prediction residual may be de-correlated using a transform 204 and/or a quantization 206 to achieve a bit-rate, such as a target bit rate. The quantized residual coefficients may be inverse quantized at quantization 210 and/or inverse transformed at transform 212, for example, to form the reconstructed residual, which may be added to the prediction block 226, for example, to form a reconstructed video block. In-loop filtering (e.g., a de-blocking filter and/or adaptive loop filters) may be applied at loop filter 266 on the reconstructed video block before the reconstructed video block may be put in the reference picture store 264 and/or used to code video blocks (e.g., future video blocks). To form the output video bit-stream 220, coding mode (e.g., inter or intra), prediction mode information, motion information, and/or quantized residual coefficients may be sent (e.g., may all be sent) to an entropy coding module 208, for example, to be compressed and/or packed to form the bit-stream.

Figure 3:
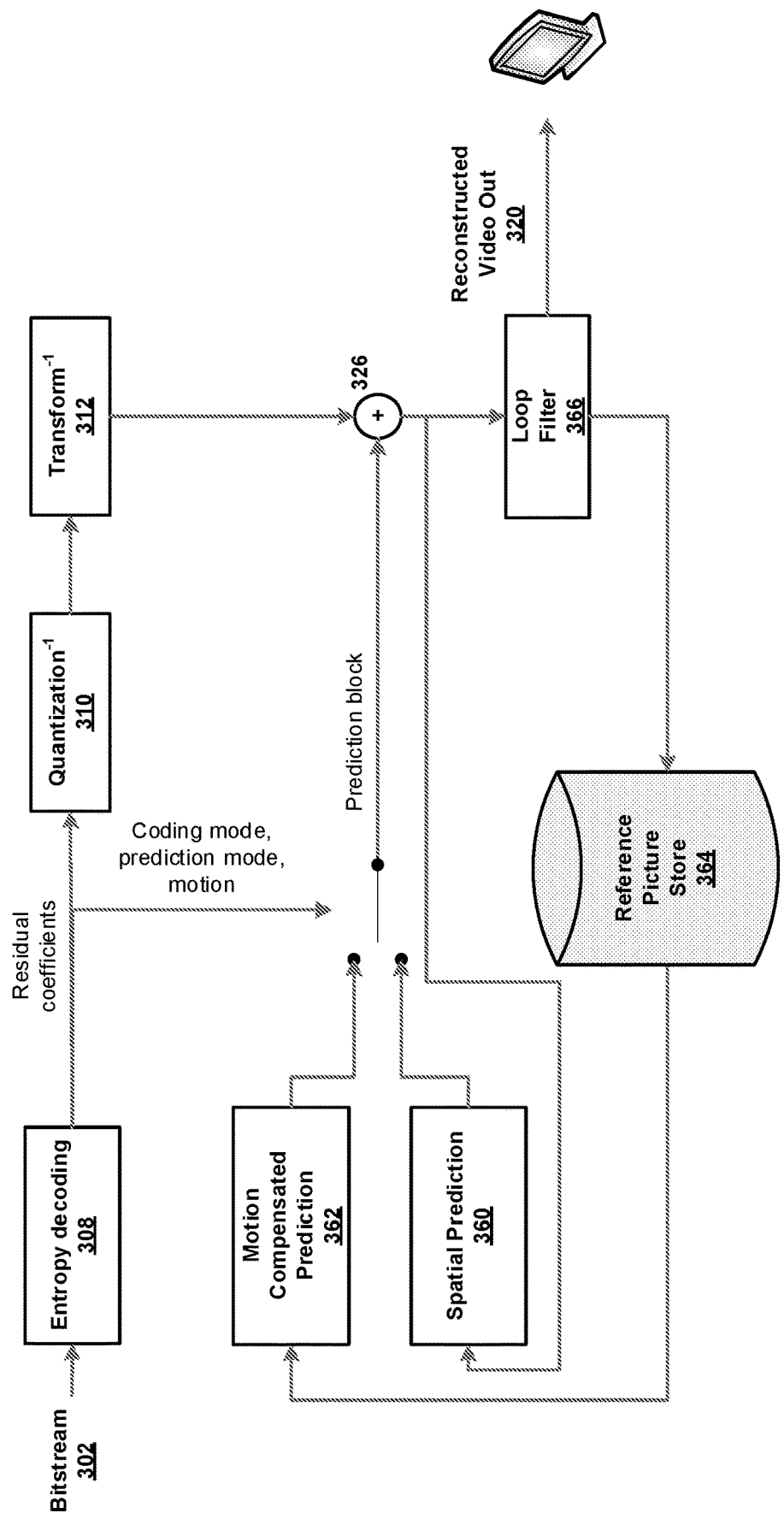
FIG. 3 is a diagram of an example video decoder.

FIG. 3 shows a block diagram of an example block-based video decoding framework for a decoder. A WTRU may include a decoder. A video bit-stream 302 (e.g., the video bit-stream 220 in FIG. 2) may be unpacked (e.g., first unpacked) and/or entropy decoded at an entropy decoding module 308. The coding mode and prediction information may be sent to a spatial prediction module 360 (e.g., if intra coded) and/or to a motion compensation prediction module 362 (e.g., if inter coded and/or temporal coded) to form a prediction block. Residual transform coefficients may be sent to an inverse quantization module 310 and/or to an inverse transform module 312, e.g., to reconstruct the residual block. The prediction block and/or the residual block may be added together at 326. The reconstructed block may go through in-loop filtering at a loop filter 366, for example, before the reconstructed block is stored in a reference picture store 364. The reconstructed video 320 in the reference picture store 364 may be sent to a display device and/or used to predict video blocks (e.g., future video blocks).

The use of bi-directional motion compensated prediction (MCP) in video codecs may remove temporal redundancies by exploiting temporal correlations between pictures. A bi-prediction signal may be formed by combining two uni-prediction signals using a weight value (e.g., 0.5). In certain videos, illuminance characteristics may change rapidly from one reference picture to another. Thus, prediction techniques may compensate for variations in illuminance over time (e.g., fading transitions) by applying global or local weights and offset values to one or more sample values in the reference pictures.

One or more coding tools may be used to compensate for changes in illuminance over time (e.g., fading transition). For example, the one or more coding tools may be used to compensate for changes in illuminance over time if motion compensation is performed. The one or more coding tools may include, for example, weighted prediction (WP). As an example of WP, a set of weights and/or offsets may be signaled at the slice level. The set of weights may include multiplicative weight(s). The set of offsets may include additive offset(s). In an example, for each reference picture in each reference picture list (L0 and L1), a set of multiplicative weight and additive offset may be signaled (e.g., at the slice level). One or more of the weight(s) and/or offset(s) may be applied during MCP, for example, when a corresponding reference picture may be used. In an example, WP may be employed if when illuminance changes linearly from picture to picture. WP may be employed if the change in illumination is global, for example, at the picture/slice level.

MCP in a bi-prediction mode may be performed using CU weights. As an example, MCP may be performed using bi-prediction with CU weights. An example of bi-prediction with CU weights (BCW) may include generalized bi-prediction (GBi). A bi-prediction signal may be calculated based on one or more of weight(s), motion-compensated prediction signal(s) corresponding to a motion vector associated with a reference picture list(s), and/or the like. In an example, the prediction signal at sample x (as given) in a bi-prediction mode may be calculated using Eq. 1.

$$P[x]=w_0*P_0[x+v_0]+w_1*P_1[x+v_1], \qquad \text{Eq. 1}$$

P[x] may denote the resulting prediction signal of a sample x located at a picture position x. $P_i[x+v_i]$ may denote the motion-compensated prediction signal of x using the motion vector (MV) $v_i$ for i-th list (e.g., list 0, list 1, etc.). $w_0$ and $w_1$ may denote the two weight values that are applied on a prediction signal(s) for a block and/or CU. As an example, $w_0$ and $w_1$ may denote the two weight values shared across the samples in a block and/or CU. A variety of prediction signals may be obtained by adjusting the weight value(s). As shown in Eq. 1, a variety of prediction signals may be obtained by adjusting weight values $w_0$ and $w_1$.

Some configurations of weight values $w_0$ and $w_1$ may indicate prediction such as uni-prediction and/or bi-prediction. For example, $(w_0, w_1)=(1, 0)$ may be used in associated with uni-prediction with reference list L0. $(w_0, w_1)=(0, 1)$ may be used in association with uni-prediction with reference list L1. $(w_0, w_1)=(0.5, 0.5)$ may be used in association with the bi-prediction with two reference lists (e.g., L1 and L2).

Weight(s) may be signaled at the CU level. In an example, the weight values $w_0$ and $w_1$ may be signaled per CU. The bi-prediction may use the CU weights. A constraint for the weights may be applied to a pair of weights. The constraint may be preconfigured. For example, the constraint for the weights may include $w_0+w_1=1$. A weight may be signaled. The signaled weight may be used to determine another weight. For example, with the constraint for CU weights, only one weight may be signaled. Signaling overhead may be reduced. Examples of pairs of weights may include {(4/8, 4/8), (3/8, 5/8), (5/8, 3/8), (−2/8, 10/8), (10/8, −2/8)}.

A weight may be derived based on a constraint for the weights, for example, when unequal weights are to be used. A WTRU may receive a weight indication and determine a first weight based on the weight indication. The WTRU may derive a second weight based on the determined first weight and the constraint for the weights.

Eq. 2 may be used. In an example, Eq. 2 may be produced based on Eq. 1 and the constraint of $w_0+w_1=1$.

$$P[x]=(1-w_1)*P_0[x+v_0]+w_1*P_1[x+v_1]. \qquad \text{Eq. 2}$$

Weight values (e.g., $w_1$ and/or $w_0$) may be discretized. Weight signaling overhead may be reduced. In an example, bi-prediction CU weight value $w_1$ may be discretized. The discretized weight value $w_1$ may include, for example, one or more of −2/8, 2/8, 3/8, 4/8, 5/8, 6/8, 10/8, and/or the like. A weight indication may be used to indicate weights to be used for a CU, for example, for bi-prediction. An example of the weight indication may include a weight index. In an example, each weight value may be indicated by an index value.

Figure 4:
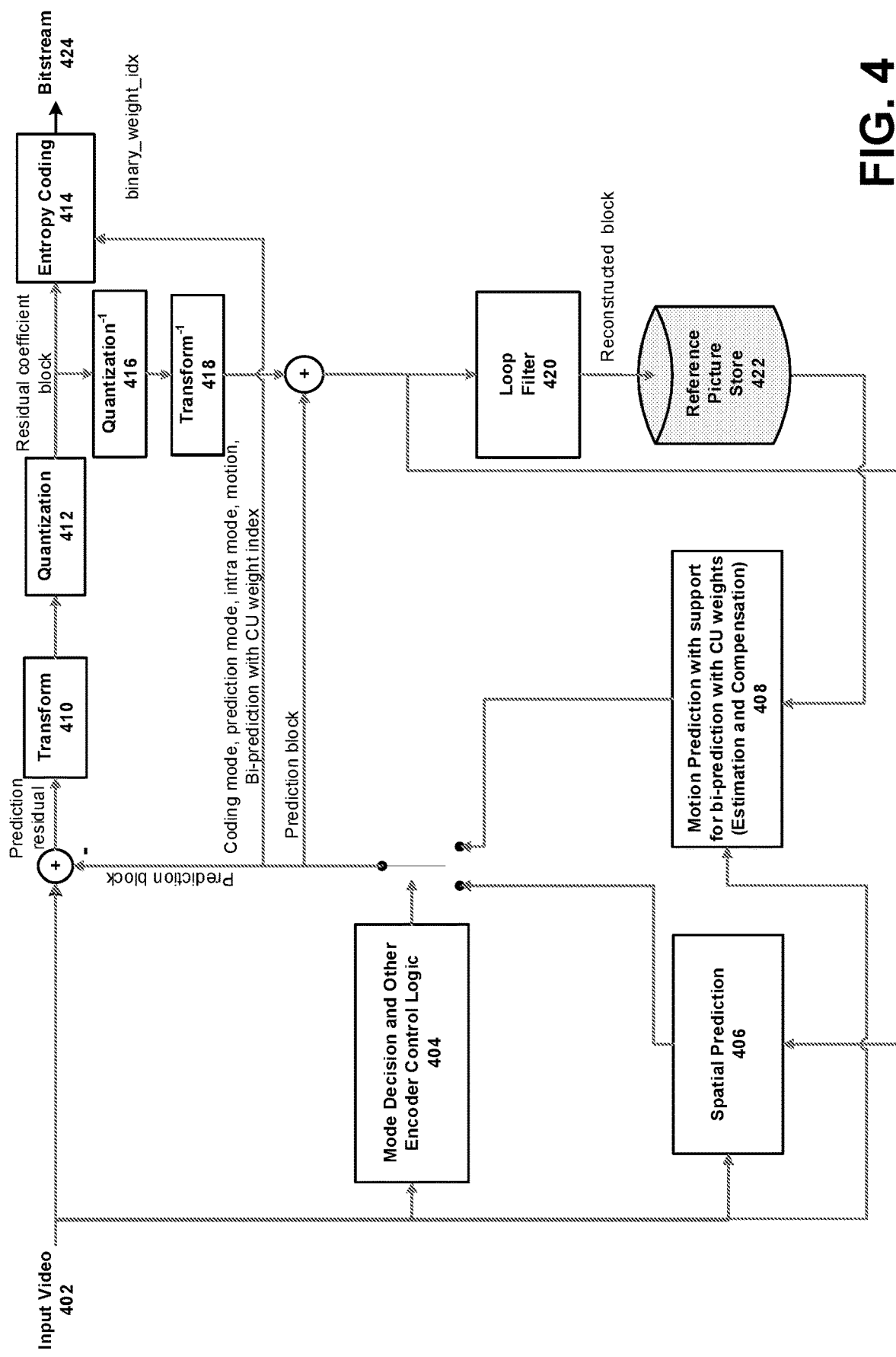
FIG. 4 is a diagram of an example block-based video encoder with support for bi-prediction with CU weights.

FIG. 4 illustrates a block diagram of an example video encoder with support of BCW (e.g., GBi). A WTRU may include an encoder as described in the example shown in FIG. 4. The encoder may include a mode decision module 404, spatial prediction module 406, a motion prediction module 408, a transform module 410, a quantization module 412, an inverse quantization module 416, an inverse transform module 418, a loop filter 420, a reference picture store 422 and an entropy coding module 414. In examples, some or all of the encoder's modules or components (e.g., the spatial prediction module 406) may be the same as, or similar to, those described in connection with FIG. 2. In addition, the spatial prediction module 406 and the motion prediction module 408 may be pixel-domain prediction modules. Thus, an input video bit-stream 402 may be processed in a similar manner as the input video bit-stream 202, to output video bit-stream 424. The motion prediction module 408 may further include support of bi-prediction with CU weights. As such, the motion prediction module 408 may combine two separate prediction signals in a weighted-averaging manner. Further, the selected weight index may be signaled in the input video bitstream 402.

Figure 5:
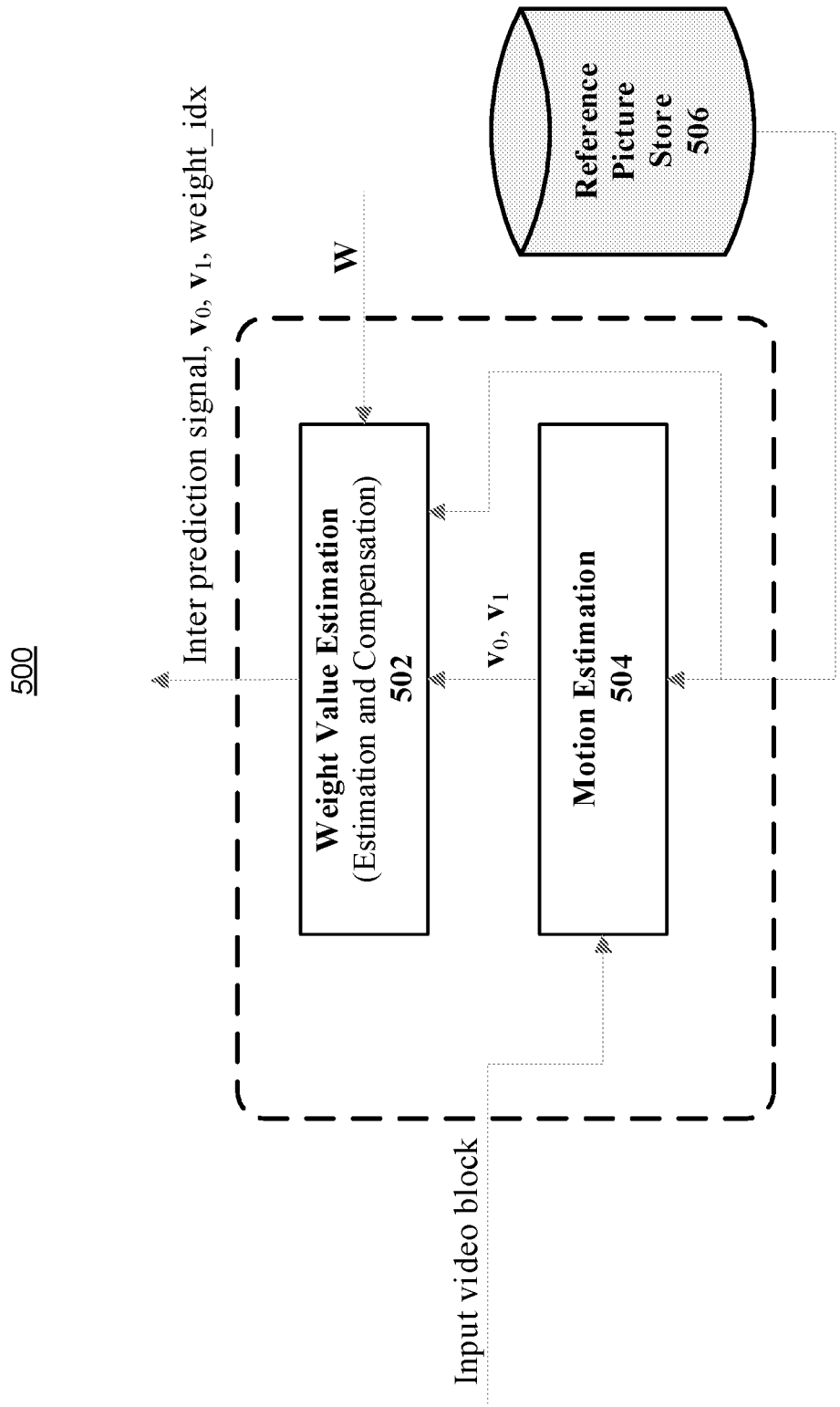
FIG. 5 is a diagram of an example module with support for bi-prediction with CU weights for an encoder.

FIG. 5 is a diagram of an example module with support for bi-prediction with CU weights for an encoder. FIG. 5 illustrates a block diagram of an estimation module 500. The estimation module 500 may be employed in a motion prediction module of an encoder, such as the motion prediction module 408. The estimation module 500 may be used in connection with BCW (e.g., GBi). The estimation module 500 may include a weight value estimation module 502 and a motion estimation module 504. The estimation module 500 may utilize a two-step process to generate inter prediction signal, such as a final inter prediction signal. The motion estimation module 504 may perform motion estimation using reference picture(s) received from a reference picture store 506 and by searching two optimal motion vectors (MVs) pointing to (e.g., two) reference blocks. The weight value estimation module 502 may search for the optimal weight index to minimize the weighted bi-prediction error between the current video block and bi-prediction prediction. The prediction signal of the generalized bi-prediction may be computed as a weighted average of the two prediction blocks.

Figure 6:
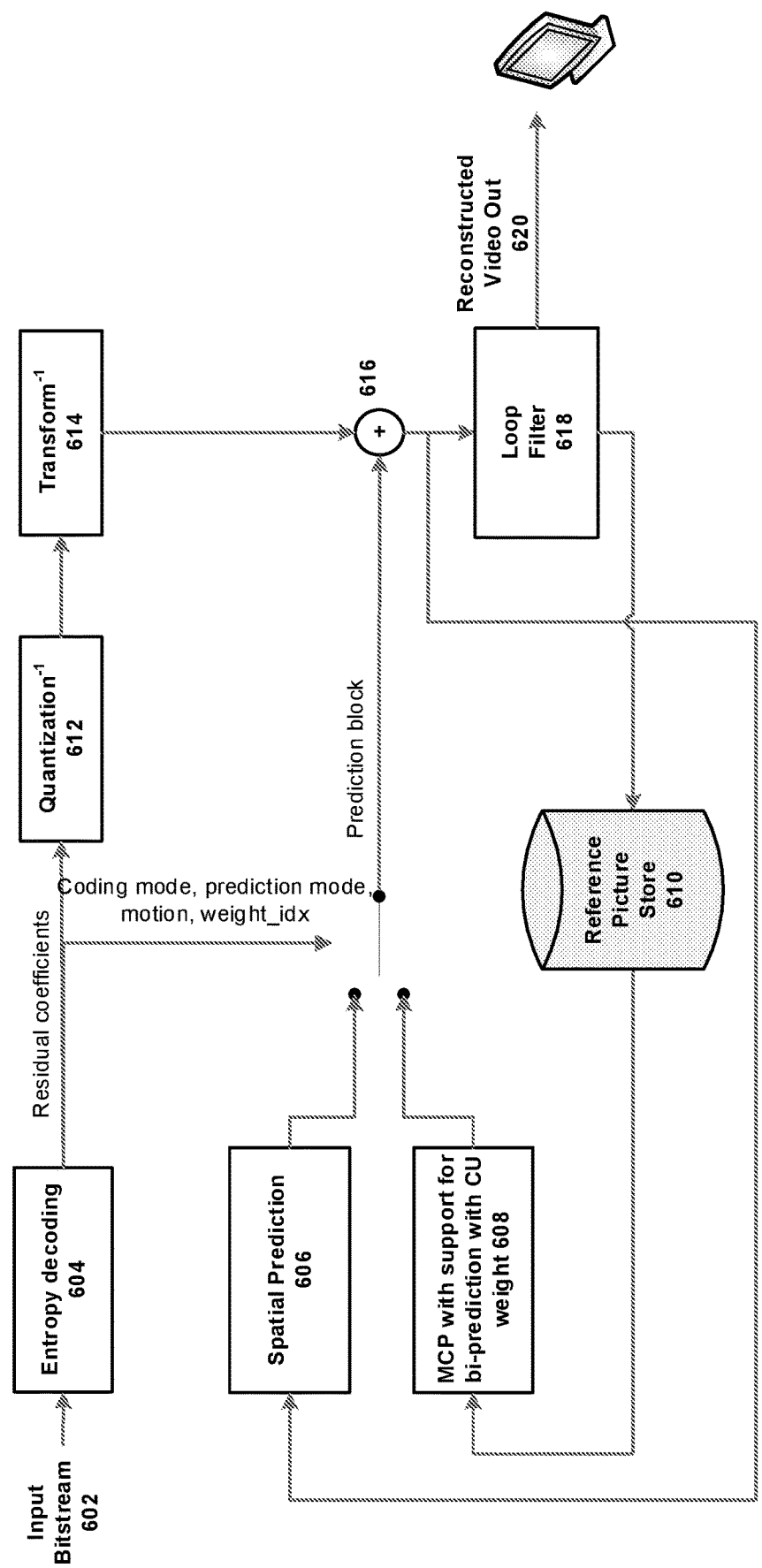
FIG. 6 is a diagram of an example block-based video decoder with support for bi-prediction with CU weights.

FIG. 6 is a diagram of an example block-based video decoder with support for bi-prediction with CU weights. FIG. 6 illustrates a block diagram of an example video decoder that may decode a bit-stream from an encoder. The encoder may support BCW and/or share some similarities with the encoder described in connection with FIG. 4. A WTRU may include a decoder as described in the example shown in FIG. 6. As shown in FIG. 6, the decoder may include an entropy decoder 604, a spatial prediction module 606, a motion prediction module 608, a reference picture store 610, an inverse quantization module 612, an inverse transform module 614 and a loop filter module 618. Some or all of the decoder's modules may be the same as, or similar to, those described in connection with FIG. 3. For example, the prediction block and/or residual block may be added together at 616. A video bit-stream 602 may be processed to generate the reconstructed video 620 that may be sent to a display device and/or used to predict video blocks (e.g., future video blocks). The motion prediction module 608 may further include support for BCW. The coding mode and/or prediction information may be used to derive a prediction signal using either spatial prediction or MCP with support for BCW. For BCW, the block motion information and/or weight value (e.g., in the form of an index indicating a weight value) may be received and decoded to generate the prediction block.

Figure 7:
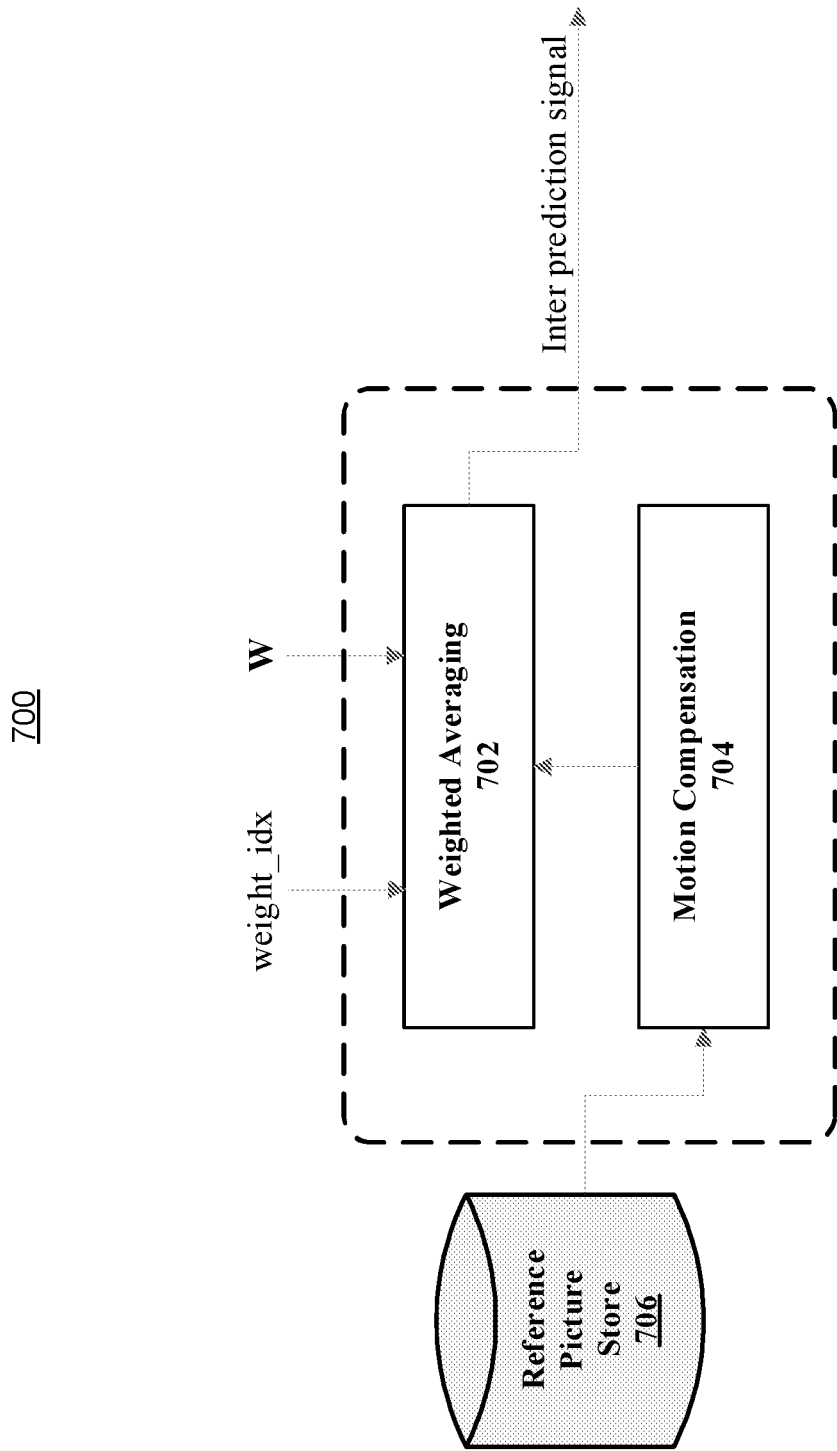
FIG. 7 is a diagram of an example module with support for bi-prediction with CU weights for a decoder.

FIG. 7 is a diagram of an example module with support for bi-prediction with CU weights for a decoder. FIG. 7 illustrates a block diagram of a prediction module 700. The prediction module 700 may be employed in a motion prediction module of a decoder, such as the motion prediction module 608. The prediction module 700 may be used in connection with BCW. The prediction module 700 may include a weighted averaging module 702 and a motion compensation module 704, which may receive one or more references pictures from a reference picture store 706. The prediction module 700 may use the block motion information and weight value to compute a prediction signal of BCW as a weighted average of (e.g., two) motion compensated prediction blocks.

There may be various types of motions within a particular video, such as zoom in/out, rotation, perspective motions and other irregular motions. A translational motion model and/or an affine motion model may be applied for MCP. The affine motion model may be four-parameter and/or six-parameter. A first flag for (e.g., each) inter coded CU may be signaled to indicate whether the translational motion model or the affine motion model is applied for inter prediction. If the affine motion model is applied, a second flag may be sent to indicate whether the model is four-parameter or six-parameter.

The four-parameter affine motion model may include two parameters for translation movement in the horizontal and vertical directions, one parameter for a zoom motion in the horizontal and vertical directions and/or one parameter for a rotation motion in the horizontal and vertical directions. A horizontal zoom parameter may be equal to a vertical zoom parameter. A horizontal rotation parameter may be equal to a vertical rotation parameter. The four-parameter affine motion model may be coded using two motion vectors at two control point positions defined at the top-left and top right corners of a (e.g., current) CU.

Figure 8:
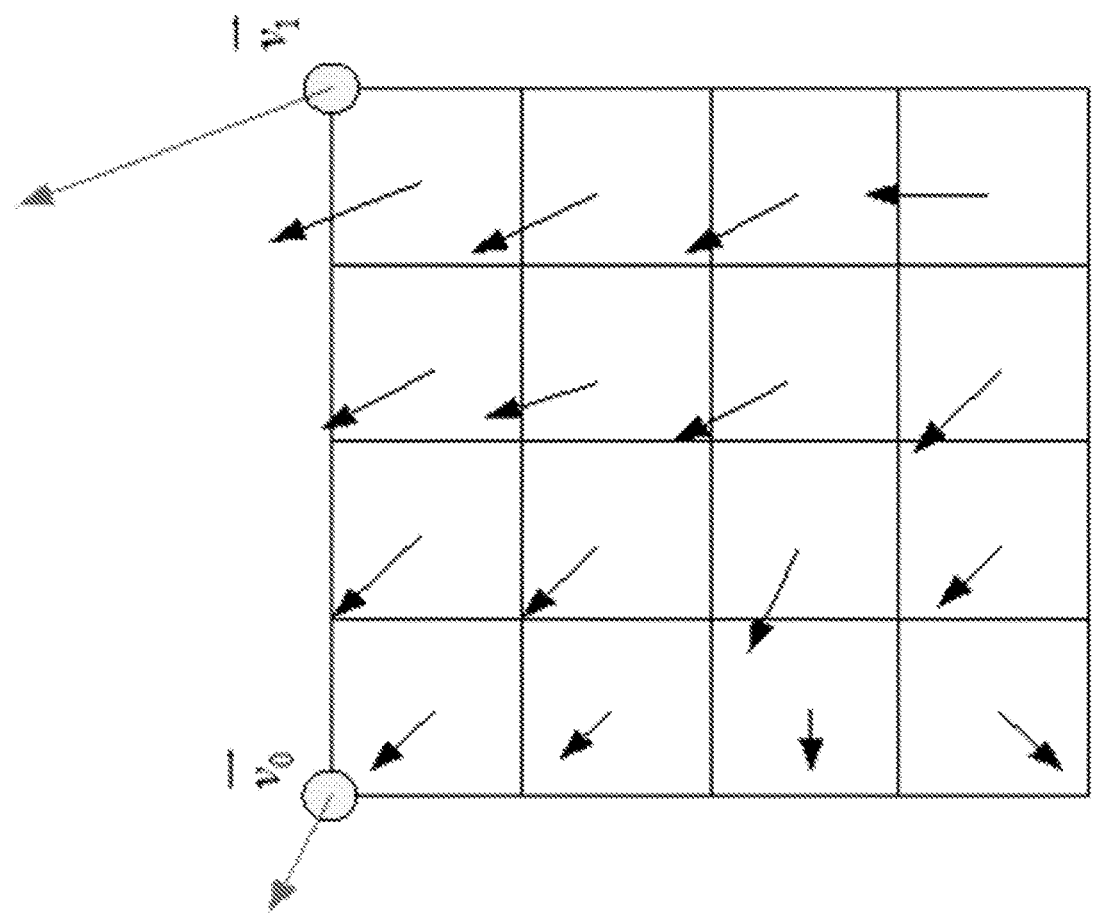
FIG. 8 is a diagram of an example four-parameter affine mode.
Figure 8:
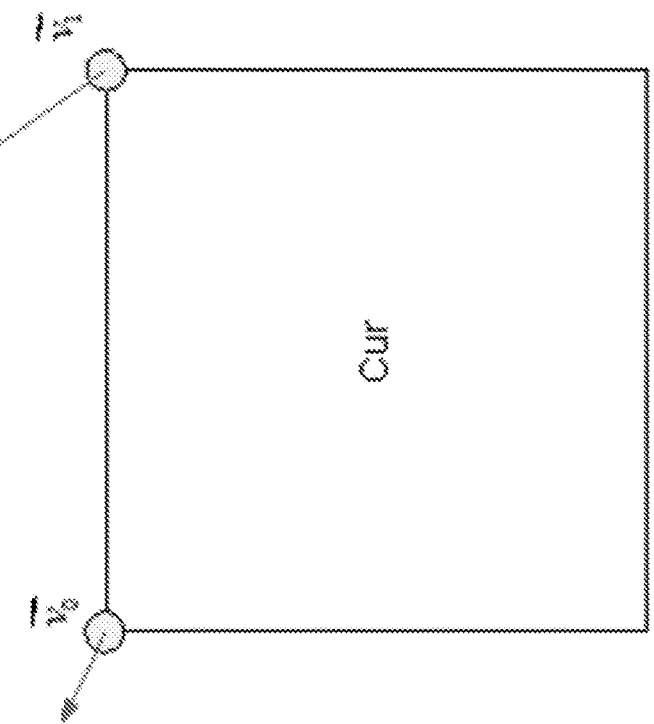

FIG. 8 is a diagram of an example four-parameter affine mode. FIG. 8 illustrates an example affine motion field of a block. As shown in FIG. 8, the block may be described by two control point motion vectors ($V_0$, $V_1$). Based on a control point motion, the motion field ($v_x$, $v_y$) of one affine coded block may be described in Eq. 3.

$$v_x = \frac{(v_{1x} - v_{0x})}{w}x - \frac{(v_{1y} - v_{0y})}{w}y + v_{0x}$$
$$v_y = \frac{(v_{1y} - v_{0y})}{w}x \left| \frac{(v_{1x} - v_{0x})}{w} y \right| v_{0y}$$

Eq. 3

In Eq. 3, ($v_{0x}$, $v_{0y}$) may be a motion vector of the top-left corner control point. ($v_{1x}$, $v_{1y}$) may be a motion vector of the top-right corner control point. w may be the width of CU. The motion field of an affine coded CU may be derived at a 4×4 block level. For example, ($v_x$, $v_y$) may be derived for each of the 4×4 blocks within a current CU and applied to a corresponding 4×4 block.

The four parameters may be estimated iteratively. The motion vector pairs at step k may be denoted as $\{(v_{0x}^k, v_{0y}^k), (v_{1x}^k, v_{1y}^k)\}$, the original luminance signal as I (i, j), and the prediction luminance signal as $I'_k$ (i, j). The spatial gradient $g_x^k$(i, j) and $g_y^k$(i, j) may be derived using a Sobel filter applied on the prediction signal $I'_k$ (i, j) in the horizontal and vertical directions, respectively. The derivative of Eq. 1 may be represented as Eq. 4

$$\begin{cases} dv_x^k(x, y) = c*x - d*y + a \\ dv_y^k(x, y) = d*x + c*y + b \end{cases}$$

Eq. 4

In Eq. 4, (a, b) may be delta translational parameters and (c, d) may be delta zoom and rotation parameters at step k. The delta MV at control points may be derived with its coordinates as Eq. 5 and Eq. 6. For example, (0, 0), (w, 0) may be coordinates for top-left and top-right control points, respectively.

$$\begin{cases} dv_{0x}^k = v_{0x}^{k+1} - v_{0x}^k = a \\ dv_{0y}^k = v_{0y}^{k+1} - v_{0y}^k = b \end{cases}$$

Eq. 5

$$\begin{cases} dv_{1x}^k = (v_{1x}^{k+1} - v_{1x}^k) = c*w + a \\ dv_{1y}^k = (v_{1y}^{k+1} - v_{1y}^k) = d*w + b \end{cases}$$

Eq. 6

Based on an optical flow equation, the relationship between the change of luminance and the spatial gradient and temporal movement may be formulated as Eq. 7.

$$I'_k(i, j) - I(i, j) = g_x^k(i, j) * dv_x^k(i, j) + g_y^k(i, j) * dv_y^k(i, j)$$

Eq. 7

Substituting $dv_x^k$(i, j) and $dv_y^k$(i, j) with Eq. 4 may produce Eq. 8 for parameters (a, b, c, d).

$$I'_k(i, j) - I(i, j) = (g_x^k(i, j)*i + g_y^k(i, j)*j)*c + (-g_x^k(i, j)*j + g_y^k(i, j)*i)*d + g_x^k(i, j)*a + g_y^k(i, j)*b$$

Eq. 8

If the samples in the CU satisfy Eq. 8, the parameter set (a, b, c, d) may be derived using, for example, the least square calculation. The motion vectors at two control points $\{(v_{0x}^{k+1}, v_{0y}^{k+1}), (v_{1x}^{k+1}, v_{1y}^{k+1})\}$ at step (k+1) may be derived with Eqs. 5 and 6, and they may be rounded to a specific precision (e.g., 1/4 pel). Using the iteration, the motion vectors at two control points may be refined until it converges when parameters (a, b, c, d) may be zeros or the iteration times meet a pre-defined limit.

Figure 9:
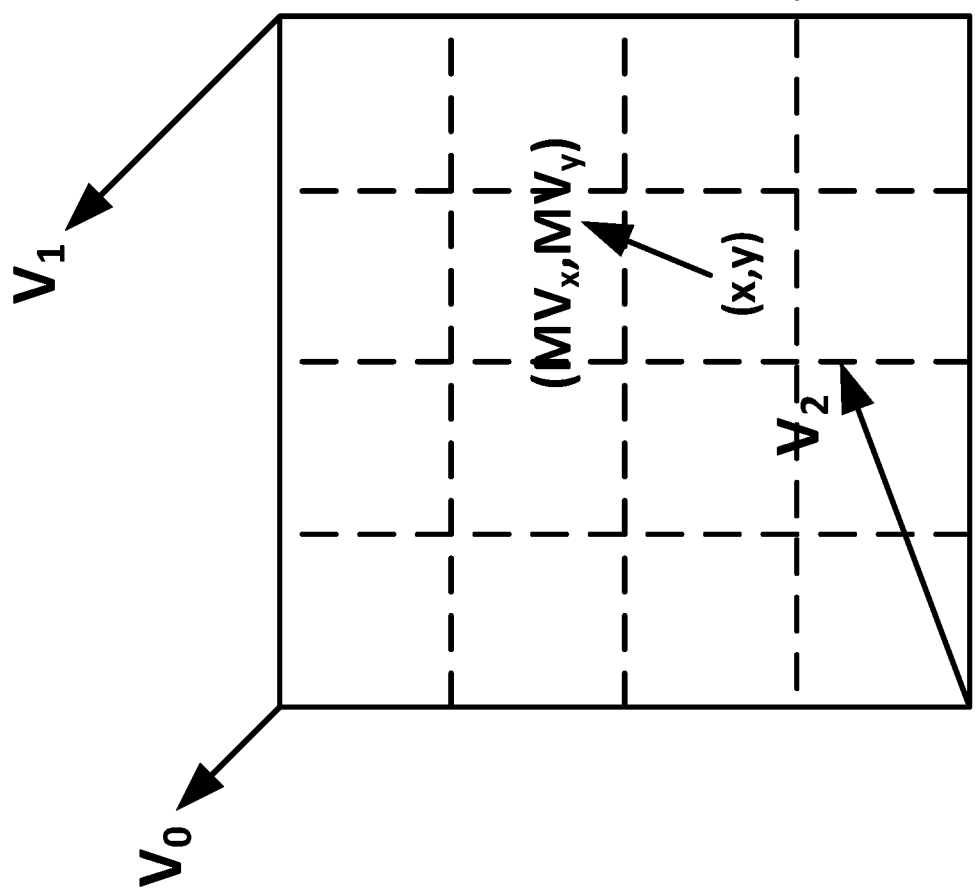
FIG. 9 is a diagram of an example six-parameter affine mode.

The six-parameter affine motion model may include two parameters for translation movement in the horizontal and vertical directions, one parameter for a zoom motion, one parameter for a rotation motion in the horizontal direction, one parameter for a zoom motion and/or one parameter for a rotation motion in the vertical direction. The six-parameter affine motion model may be coded with three motion vectors at three control points. FIG. 9 is a diagram of an example six-parameter affine mode. As shown in FIG. 9, three control points for the six-parameter affine coded CU may be defined at the top-left, top-right and/or bottom left corners of CU. The motion at the top-left control point may be related to a translational motion. The motion at the top-right control point may be related to rotation and zoom motions in the horizontal direction. The motion at the bottom-left control point may be related to rotation and zoom motions in the vertical direction. In the six-parameter affine motion model, the rotation and zoom motions in the horizontal direction may not be same as those motions in the vertical direction. In an example, the motion vector of each sub-block ($v_x$, $v_y$) may be derived from Eqs. 9 and 10 using three motion vectors as control points:

$$v_x = v_{0x} + (v_{1x} - v_{0x})*\frac{x}{w} + (v_{2x} - v_{0x})*\frac{y}{h}$$

Eq. 9

$$v_y = v_{0y} + (v_{1y} - v_{0y})*\frac{x}{w} + (v_{2y} - v_{0y})*\frac{y}{h}$$

Eq. 10

In Eqs. 9 and 10, ($v_{2x}$, $v_{2y}$) may be a motion vector of the bottom-left control point. (x, y) may be a center position of a sub-block. w and h may be a width and height of a CU.

The six parameters of the six-parameter affine model may be estimated, for example, in a similar way. For example, Eq. 11 may be produced based on Eq. 4.

$$\begin{cases} dv_x^k(x, y) = c*x + d*y + a \\ dv_y^k(x, y) = e*x + f*y + b \end{cases}$$

Eq. 11

In Eq. 11, for step k, (a, b) may be delta translation parameters. (c, d) may be delta zoom and rotation parameters for the horizontal direction. (e, f) may be delta zoom and rotation parameters for the vertical direction. For example, Eq. 12 may be produced based on Eq. 8.

$$I'_k(i, j) - I(i, j) = (g_x^k(i, j)*i)*c + (g_x^k(i, j)*j)*d + (g_y^k(i, j)*i)*e + (g_y^k(i, j)*j)*f + g_x^k(i, j)*a + g_y^k(, j)*$$

Eq. 12

The parameter set (a, b, c, d, e, f) may be derived using the least square calculation by considering the samples within the CU. The motion vector of the top-left control point ($v_{0x}^{k+1}$, $v_{0y}^{k+1}$) may be calculated using Eq. 5. The motion vector of the top-right control point ($v_{1x}^{k+1}$, $v_{1y}^{k+1}$) may be calculated using Eq. 13. The motion vector of the top-right control point ($v_{2x}^{k+1}$, $v_{2y}^{k+1}$) may be calculated using Eq. 14.

$$\begin{cases} dv_{1x}^k = (v_{1x}^{k+1} - v_{1x}^k) = c*w + a \\ dv_{1y}^k = (v_{1y}^{k+1} - v_{1y}^k) = e*w + b \end{cases}$$

Eq. 13

-continued $$\begin{cases} dv_{2x}^k = (v_{2x}^{k+1} - v_{2x}^k) = d*h + a \\ dv_{2y}^k = (v_{2y}^{k+1} - v_{2y}^k) = f*h + b \end{cases}$$ Eq. 14

Adaptive precision for translational motion models may be utilized. For a CU coded as non-merge and non-affine inter mode, the motion vector difference (MVD) between the current CU's motion vector and its predictor may be coded in different precisions, such as 1/4-pel, 1-pel or 4-pel precision. 1/4-pel may be a fractional precision. 1-pel and 4-pel may both belong to an integer precision. In examples, the precision may be signaled with multiple (e.g., two) flags for each CU to indicate the MVD precision. The first flag may indicate whether the precision is a fractional precision, such as 1/4-pel. If the precision is not a fractional precision (e.g., 1/4-pel), the second flag may be signaled to indicate whether the precision is an integer precision, such as 1-pel or 4-pel precision. In motion estimation, the delta motion vector may be searched around an initial motion vector, which may be treated as a starting position. The starling position may be selected from its spatial and temporal predictors. The starting motion vector may be rounded to the precision for MVD signaling, for example, to facilitate implementation. The MVD candidates having the determined (e.g., required) precision may be searched.

The motion vector predictor may be rounded to the MVD precision. An encoder may check a rate distortion (RD) cost for different MVD precisions and/or select an MVD precision. In an example, the selected MVD precision may be an optimal precision with minimal RD cost. The RD cost may be calculated by the weighted sum of a sample value distortion and a coding rate. The RD cost may be a measurement of coding performance. A coding mode with a lower RD cost may exhibit better overall coding performance. An MVD precision related flag may be signaled when at least one of the MVD components (e.g., the horizontal or vertical component of a L0 or L1 motion vector) is not zero. Signaling overhead may be reduced. If the signaled MVD components are zero, the MVD precision may be inferred to be 1/4 pel precision.

Figure 10:
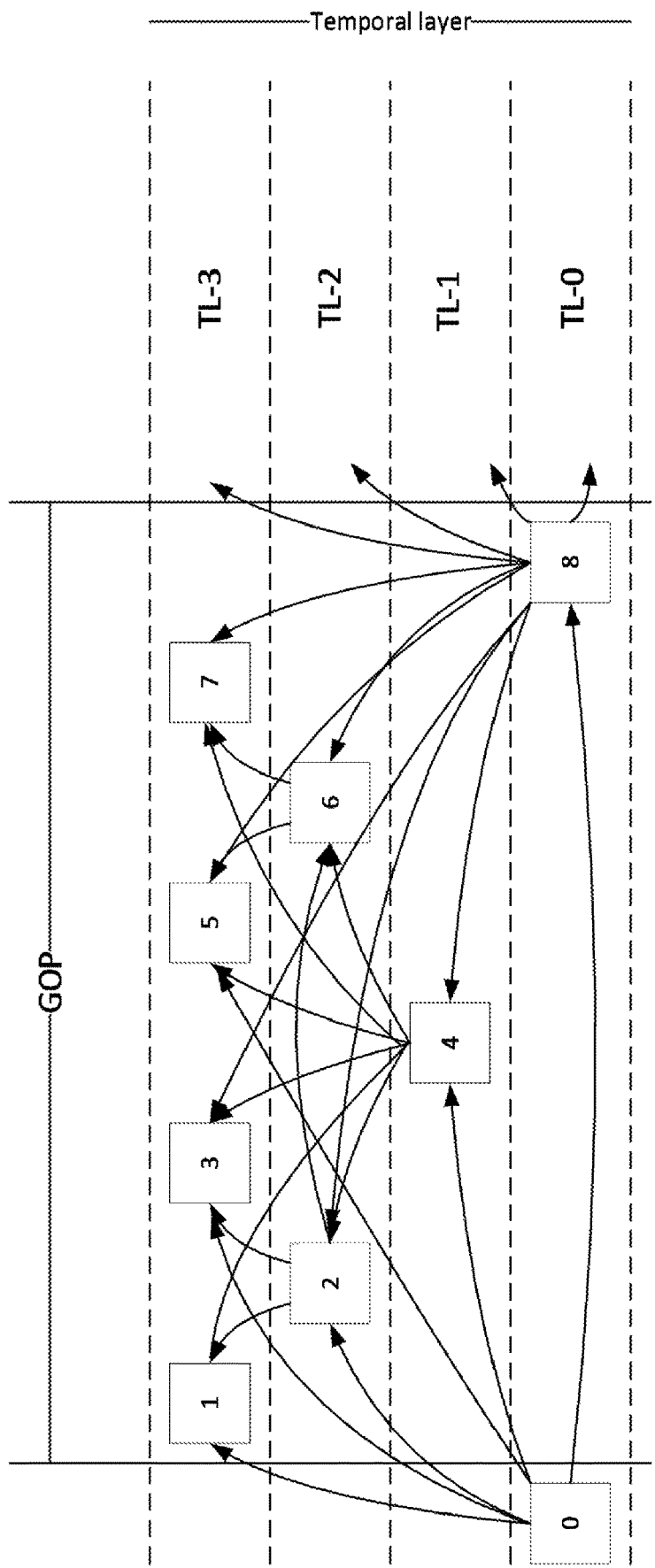
FIG. 10 is a diagram of an example hierarchical prediction structure with temporal layers (TLs).

A hierarchical prediction structure may be used in a random access configuration to provide (e.g., efficient) temporal prediction. FIG. 10 is a diagram of an example hierarchical prediction structure with temporal layers (TLs). FIG. 10 illustrates an example hierarchical prediction using four temporal layers (TLs) (e.g., TL-0, TL-1, TL-2 and TL-3) in connection with pictures having a picture order count (POC), such as pictures 0-8. The arrows in FIG. 10 depict the prediction relationship between a current picture and its reference picture(s). Arrows starting from the reference picture(s) may lead to a current picture being predicted. In hierarchical prediction, higher TL pictures may be predicted from reference pictures that are closer in temporal distance. For example, pictures in TL-3 (e.g., picture 3) may be predicted from temporally neighboring pictures (e.g., picture 2 in TL-2). Lower TL pictures may have larger temporal distances from their reference pictures. As shown in FIG. 10, picture 8 in TL-0 may be 8 pictures away from its reference picture 0 in TL-0. The picture(s) in a highest TL, such as TL-3 in FIG. 10, may not serve as reference pictures. They may be referred to as non-reference pictures. While FIG. 10 illustrates an example with four TLs, any suitable number of TLs (e.g., five or more) may be employed to achieve a desired (e.g., deeper) hierarchy.

In hierarchical prediction, picture/slice level quantization parameter (QP) values may be adapted, for example, depending on the TL the current picture is in. For example, QP0 may be used for pictures in TL0 and QP0+delta(TLx) may be used for a picture in TLx. Delta( ) may be a function based on the TL. Delta( ) may be a zero or positive integer. In an example, delta(TLx) may be set to TLx.

Bi-prediction in video coding may be based on a combination of multiple (e.g., two) temporal prediction blocks and/or CUs. The temporal prediction blocks (and/or CUs) may be combined. In an example, two temporal prediction blocks that are obtained from the reference pictures that are reconstructed may be combined using averaging. Bi-prediction may be based on block-based motion compensation. A relatively small motion may be observed between the (e.g., two) prediction blocks in bi-prediction.

Bi-directional optical flow (BDOF) may be used, for example, to compensate the relatively small motion observed between prediction blocks. BDOF may be applied to compensate for such motion for a sample inside a block. In an example, BDOF may compensate for such motion for individual samples inside a block. This may increase the efficiency of motion compensated prediction.

BDOF may include refining motion vector(s) associated with a block and/or CU. In examples, BDOF may include sample-wise motion refinement that is performed on top of block-based motion-compensated predictions when bi-prediction is used. BDOF may include deriving refined motion vector(s) for a sample. As an example of BDOF, the derivation of the refined motion vector for individual samples in a block may be based on the optical flow model.

BDOF may include refining a motion vector associated with a block and/or CU based on one or more of the following: a location of a block and/or CU; gradients (e.g., horizontal, vertical, and/or the like) associated with the location of the block and/or CU; sample values associated with a corresponding reference picture list for the location; and/or the like. Eq. 14B may be used for deriving refined motion vector for a sample. As shown in Eq. 14B, $I^{(k)}(x, y)$ may denote the sample value at the coordinate (x, y) of the prediction block, derived from the reference picture list k (k=0, 1). $\partial I^{(k)}(x, y)/\partial x$ and $\partial I^{(k)}(x, y)/\partial y$ may be the horizontal and vertical gradients of the sample. The motion refinement $(v_x, v_y)$ at (x, y) may be derived using Eq. 14B. Eq. 14B may be based on an assumption that the optical flow model is valid.

$$\frac{\partial I^{(k)}(x, y)}{\partial t} + v_x \cdot \frac{\partial I^{(k)}(x, y)}{\partial x} + v_y \cdot \frac{\partial I^{(k)}(x, y)}{\partial y} = 0$$ Eq. 14B BDOF prediction may be based on optical flow model and/or interpolation of the prediction blocks along the motion trajectory. Eq. 14C may show an example of using the combination of the optical flow model (e.g., shown in Eq. 14B) and the interpolation of the prediction blocks along the motion trajectory for BDOF prediction. $\tau_1$ and $\tau_0$ may denote time distances from reference pictures to the current picture.

$$pred_{BIO}(x, y) = \frac{1}{2} \cdot \begin{bmatrix} I^{(0)}(x, y) + I^{(1)}(x, y) + \\ \frac{v_x}{2}\left(\tau_1 \frac{\partial I^{(1)}(x, y)}{\partial x} - \tau_0 \frac{\partial I^{(0)}(x, y)}{\partial x}\right) + \\ \frac{v_y}{2}\left(\tau_1 \frac{\partial I^{(1)}(x, y)}{\partial y} - \tau_0 \frac{\partial I^{(0)}(x, y)}{\partial y}\right) \end{bmatrix}$$ Eq. 14C Multiple coding techniques may be utilized together in an example encoder/decoder (e.g., the example encoder shown in FIG. 4 and the example decoder shown in FIG. 6). In an example, WP and BCW (e.g., GBi) may be utilized together in the example encoder/decoder. WP may be enabled when BCW and WP are used together. For example, reference pictures may be signaled with WP parameters, such as weight and offset. At the coding block level, a BCW weight may be signaled if the reference pictures are coded with bi-prediction. The WP parameters may be associated with a global illuminance change. The parameters for BCW may be associated with a local illuminance change for the coding block.

The WP parameters and parameters for BCW may be applied together. For example, the WP parameters and parameters for BCW may be applied as part of a two-step process. As an example of the two-step process, the WP parameters may be applied first, followed by the parameters for BCW. Eq. 15 may show an example of applying the WP parameters and the parameters for BCW. As shown in FIG. 15, a coding block B may be bi-predicted with reference pictures $r_0$ and $r_1$ from two reference picture lists. $P(r_0)$ and $P(r_1)$ may represent two predictors from $r_0$ and $r_1$. The WP parameters for $r_0$ and $r_1$ may include $(W_0, O_0)$ and $(W_1, O_1)$. The weighting parameters of bi-prediction with CU weights for $r_0$ and $r_1$ may include $((1-W_{GBi}), W_{GBi})$.

$$P_{bi\text{-}pred} = (1-W_{GBi})*(W_0*P(r_0)+O_0)+W_{GBi}*(W_1*P(r_1)+O_1) \qquad \text{Eq. 15}$$

As an example of a fixed-point implementation, WP and BCW (e.g., GBi) may include one or more bits for scaling, such as the number of bits for scaling $N_{GBi}$, $N_{WP}$. Eq. 15 may be written as the example shown in Eq. 16.

$$P_{bi\text{-}pred} = ((S_{GBi}-W'_{GBi})*(W'_0*P(r_0)+O'_0)+W'_{GBi}*(W'_1*P(r_1)+O'_1)+\text{round}) >> (N_{GBi}+N_{WP}) \qquad \text{Eq. 16}$$

In Eq. 16, $S_{GBi}$ may be equal to $(1<<N_{GBi})$. $W'_{GBi}$ may be a fixed-point representation of $W_{GBi}$ scaled by $S_{GBi}$. $(W'_0, O'_0)$ and $(W'_1, O'_1)$ may be a fixed-point representation of WP parameters scaled by $(1<<N_{WP})$. The round value may be equal to $(1>>(N_{GBi}+N_{WP}-1))$ and may be used for rounding.

In examples, BCW may be used when WP is not used for a coding block coded with bi-prediction. GBi may not be used when WP is used for a coding block coded with bi-prediction. For example, for some reference pictures, the WP parameters may not be signaled. For some reference pictures, the weight may be 1 and the offset may be 0. The parameter(s) for BCW may be signaled if the current block does not use WP for both reference pictures. If the current coding block uses WP in either reference picture list, the parameter(s) for BCW may not be signaled. Signaling overhead associated with BCW may be reduced.

In examples, if a coding block uses WP, the parameter(s) for BCW may be signaled. The bi-prediction signal may be generated by using the CU weight(s) for BCW and the offset parameter of WP when the CU weight is not equal to a certain value (e.g., 0.5). In an example, Eq. 17 may be produced based on Eq. 15.

$$P_{bi\text{-}pred} = (1-W_{BCW})*(P(r_0)+O_0)+W_{BCW}*(P(r_1)+O_1) \qquad \text{Eq. 17}$$

If the CU weight is equal to a certain value (e.g., 0.5), unmodified WP may be applied. In examples, at the encoder side, the WP offsets may be considered in bi-prediction motion estimation given a weight (e.g., not equal to 0.5). A change in global illuminance may be compensated by the WP offset, and a change in local illuminance may be compensated by the CU weight.

BCW (e.g., GBi) may be based on one or more weights. The BCW weights may be signaled. In an example, five weights (e.g., −2/8, 3/8, 4/8, 5/8, and 10/8) may be used for a low-delay picture and three weights (e.g., 3/8, 4/8, 5/8) may be used for a non-low-delay picture. If a CU is coded using bi-prediction mode, a BCW weight for the CU may be signaled. For example, a weight indication may be used to indicate BCW weights to be used for the current CU in BCW. As shown in Table 1, the weight indication may include an index value corresponding to a predetermined BCW weight (e.g., −2/8, 3/8, 4/8, 5/8, and 10/8). Different predetermined BCW weights may have different corresponding index values.

In an example, if a CU is coded using bi-prediction mode, a BCW weight may be signaled based on truncated unary coding. Table 1 may show an example truncated unary coding scheme for low-delay pictures. Table 2 may show an example truncated unary coding scheme for non-low-delay pictures.

TABLE 1

Binarization of BCW weight index (e.g., for GBi) for a low-delay picture(s)

| Weight Index (e.g., for GBi) | Weight value of $w_1$ | Binarization of weight Index |
| --- | --- | --- |
| 0 | −2/8 | 0000 |
| 1 | 3/8 | 001 |
| 2 | 4/8 | 1 |
| 3 | 5/8 | 01 |
| 4 | 10/8 | 0001 |

TABLE 2

Binarization of BCW weight index (e.g., for GBi) for a non-low-delay picture(s)

| Weight Index (e.g., for GBi) | Weight value of $w_1$ | Binarization of weight Index |
| --- | --- | --- |
| 0 | 3/8 | 00 |
| 1 | 4/8 | 1 |
| 2 | 5/8 | 01 |

A certain weight may be considered the most frequently used weight. For example, weight 4/8 may be considered the most frequently used weight. The weight that is considered as the most frequently used weight may be signaled using a smaller number of bits than the number of bits uses to signal other weights. The weight that is considered as the most frequently used weight may be signaled with the least number of bits. In an example, the weight that is considered as the most frequently used weight may be signaled with 1 bit. If no weights are signaled, the most frequently used weight may be the default weight.

The weight of a CU may be derived, for example, based on the weight of a neighbor CU(s). In an example, the weight of a CU may be the same as the weight of a neighbor CU(s), which may occur due to factors such as spatial correlation. The weight of a CU may be derived based on spatial correlation. Signaling overhead may be reduced.

In an example, a most probable weight for the current CU may be derived from the neighbor CU(s). For example, the most probable weight of the current CU may be set to be the most used weight of five spatial neighbor CUs. The five spatial neighbor CUs may include (e.g., in merge mode) the left, above, left-bottom, above-right and top-left neighbors. If a neighbor CU is not coded using bi-prediction or using merge-mode, the neighbor CU's weight may be treated as a certain value (e.g., 4/8).

An indication (e.g., a flag) may be signaled to indicate whether the current CU's weight is equal to the most probable weight. If the current CU's weight differs from the most probable weight, the weight may be signaled. In an example herein, there may be four remaining weights for a low-delay picture and two remaining weights for a non-low-delay picture. The remaining weights may be signaled with variable length coding (e.g., after binarization) and/or with fixed length coding. If the fixed length coding is used, four weights may be signaled using two bits per weight value, and two weights may be signaled using one bit per weight value.

BCW (e.g., GBi) may be applied to one or more motion models, including one more of a translational model, a four-parameter affine motion model, a six-parameter affine motion model, and/or the like. One or more weights may be used for bi-prediction with CU weights. As an example herein, five weights (e.g., −2/8, 3/8, 4/8, 5/8, 10/8) may be used for low-delay pictures, and/or three weights (e.g., 3/8, 4/8, 5/8) may be used for non-low-delay pictures. Weights may be selected for a bi-prediction inter coding mode of a different MVD precision (e.g., 1/4-pel, 1-pel, 4-pel, and/or the like). In an example, for each bi-prediction inter coding mode with a different MVD precision, weight may be selected based on an RD cost. RD cost calculations (e.g., for GBi) may include motion estimation for bi-prediction and/or entropy coding. Affine motion estimation may be disabled in certain cases.

Certain motion estimations associated with motion models and/or or MVD precisions may be skipped based on BCW weights. In an example, the affine motion estimation for different weights may be terminated early. Certain weight candidate selection associated with a MVD precision may be bypassed. Certain weight candidate selection for certain MVD precisions may be bypassed. In an example, motion estimations for some weights that are not the most probable weight may be skipped for a certain motion model and/or certain MVD precisions.

Affine motion estimation associated with certain weights may be disabled or bypassed. Affine motion estimation may be an iterative process. Affine motion estimation (e.g., for each iteration) may include one or more of applying motion compensation to generate a prediction signal; calculating a horizontal gradient and/or a vertical gradient using the prediction signal; calculating a correlation matrix; deriving the affine motion model parameters based on the least square calculation; and/or the like. The level of computation of one iteration may be relatively high. Motion estimation associated with one or more weights may be performed. For example, if bi-prediction with CU weights is enabled, the possible weights associated with reference picture lists of the coding block a CU may be tested or tried. For a weight, the encoder may perform four-parameter affine motion estimation and/or six-parameter affine motion estimation. Affine motion estimation may be terminated early if the weight is equal, or not equal, to a specific value. In an example, affine motion estimation may be disabled or bypassed if the weight is not equal to 4/8.

Affine motion estimation may be performed on a condition that the weight is equal to a certain value (e.g., 4/8) and not performed for other weights. As such, a respective weight (e.g., 4/8) may be applicable for an affine coding mode. The affine mode may be indicated or signaled, for example, before the weight for an inter coded CU is indicated or signaled. The weight may be inferred if the coding block is affine mode. The weight may not be signaled if the coding block is affine mode. Signaling overhead for an affine coded CU may be reduced.

Coding results associated with certain weight(s) may be used to determine whether to disable or bypass affine motion estimation associated with other weights. In an example, the RD cost for the motion estimation associated with weight 4/8 may be used to determine whether to bypass affine motion estimation associated with other weights. The encoder may evaluate the RD cost of weights in a certain order. For example, the encoder may first evaluate weight 4/8 followed by weights −2/8, 10/8, 3/8, and 5/8. The encoder may use the coding results of weight 4/8 to determine whether to bypass affine motion estimation associated with other weights. For example, if the motion estimation cost of the affine model is bigger than the motion estimation cost of the translational model multiplied by a threshold (e.g., 1.05) when the weight is 4/8, the affine motion estimation may be skipped for one or more other weights, such as −2/8, 10/8, 3/8, and/or 5/8.

Figure 11:
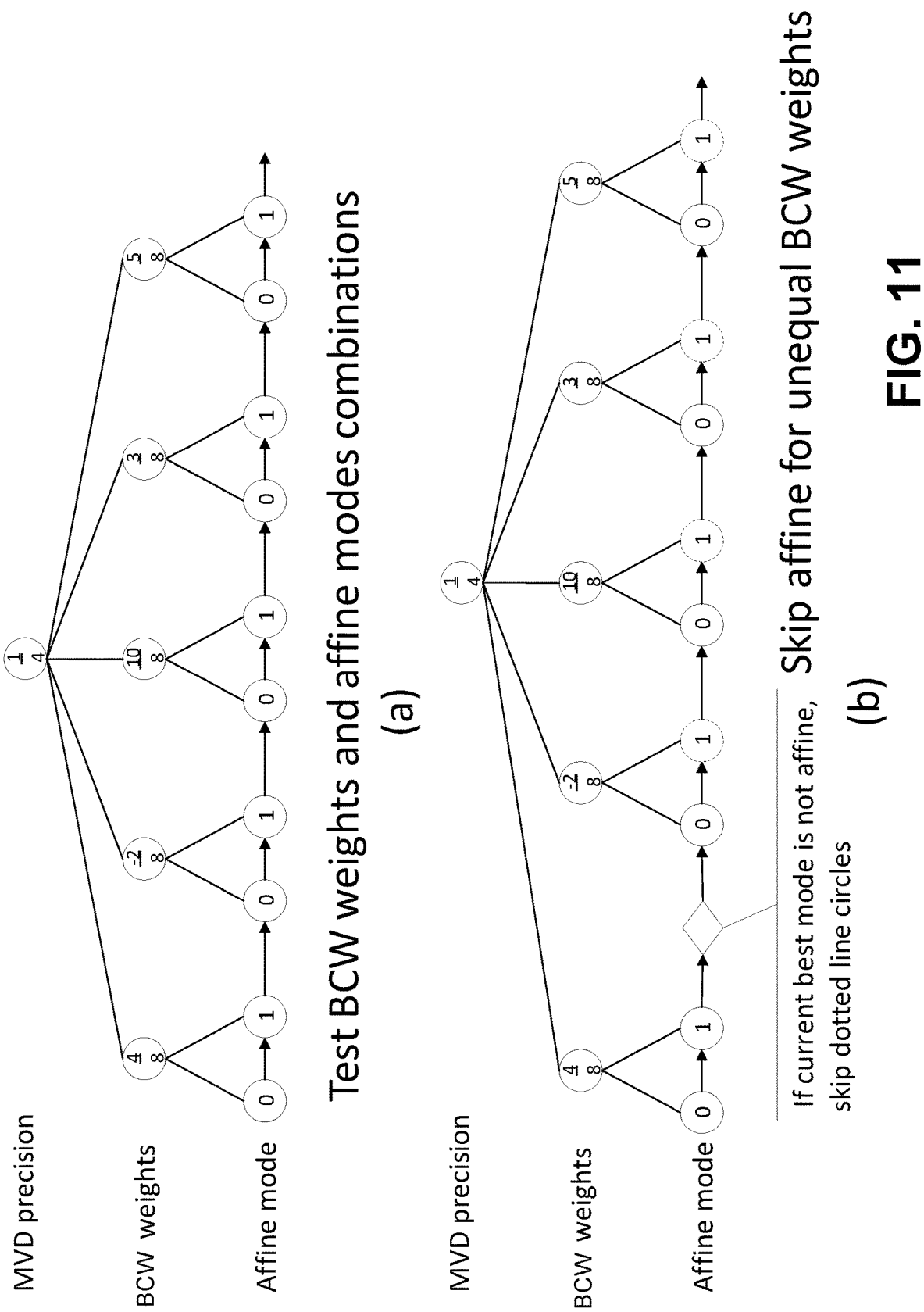
FIG. 11 is a diagram of an example for determining whether to skip affine for certain MVD precision and/or weights.

The encoder may determine whether to bypass affine motion estimation for one or more other weights based on the current mode. FIG. 11 is a diagram of an example for determining whether to skip affine for certain MVD precision and/or weights. In an example shown in 11(a), all weights and affine mode may be checked for pel 1/4. In an example shown in 11(b), the encoder may check the (e.g., best) coding mode after the encoding with weight 4/8. The BCW weights may include $W_{BCW}$ as shown in Eq. 17. For example, the sum of the weights for each list may be 1. $W_{BCW}$ may be for list1, and the weight for list0 may be $(1-W_{BCW})$. If the affine mode with weight 4/8 is selected as current (e.g., best) mode, affine motion estimation for other weights may be performed. In this case, the motion estimation for the translational model may or may not performed. If the affine mode with weight 4/8 is not selected as current (e.g., best) mode, affine motion estimation may be skipped for one or more other weights, such as −2/8, 10/8, 3/8, and/or 5/8. The weight associated with the affine mode may be for one list, and the weight for another list may be derived based on the sum of two weights being 1. For example, using this constraint, if 4/8 is for one list, then the weight for another list may be 4/8, indicating equal weight.

Weight candidate selection may be terminated early among different MVD precisions. Certain weight candidate selection associated with certain MVD precisions may be bypassed. A coding system may support one or more precisions (e.g., 1/4-pel, 1-pel, 4-pel) for MVD. The encoder may calculate the RD cost of the one or more precisions (e.g., three) and/or select the best precision based on the calculated RD cost The encoder may compare the RD costs of the one or more precisions. The best precision may be the one with a relatively low (e.g., the lowest) RD cost. The encoder may calculate the RD cost of the one or more precisions in order. In an example, when bi-prediction with CU weights (e.g., GBi) is enabled, different weights may be tested for each MVD precision. In some cases, bi-prediction search may be performed for each weight.

RD calculation for some weights associated with certain MVD precisions may be bypassed. The coding device (e.g., encoder and/or decoder) may record the RD cost of different weights when MVD precision is a certain value (e.g., 1/4-pel). The coding device may order some or all of the weights in ascending or descending order based on the RD cost of the weights except certain weight value. In an example, the coding device may order the weights associated with the recorded RD cost in ascending or descending order according to the weights' RD cost except weight 4/8. The coding device may not test all weights for 1-pel and/or 4-pel precisions. In an example, the first few weights among the ordered weights and/or 4/8 weight may be selected to test for 1-pel and 4-pel precisions. The number of weights to be tested for 1-pel precision and 4-pel MVD precision may be reduced.

Some bi-prediction (e.g., GBi) search may be skipped for the same reference picture in more than one reference picture list. For example, for some pictures at lower TLs in a hierarchical prediction structure, the same picture may occur in multiple reference picture lists (e.g., list0 and list1). Table 3 may include a reference picture structure for a first group of pictures (GOP). As shown in Table 3, the GOP size may be 16. POC may be the picture order count of the current picture. TL may be the temporal level that the current picture belongs to. L0 and L1 may identify the POC values of the reference pictures that are used by the respective reference picture list of the two reference picture lists for current picture coding.

TABLE 3

Reference Picture Structure for Example GOP

| POC: 16, | TL: 0, | [L0: 0] | [L1: 0] |
| POC: 8, | TL: 1, | [L0: 0 16] | [L1: 16 0] |
| POC: 4, | TL: 2, | [L0: 0 8] | [L1: 8 16] |
| POC: 2, | TL: 3, | [L0: 0 4] | [L1: 4 8] |
| POC: 1, | TL: 4, | [L0: 0 2] | [L1: 2 4] |
| POC: 3, | TL: 4, | [L0: 2 0] | [L1: 4 8] |
| POC: 6, | TL: 3, | [L0: 4 0] | [L1: 8 16] |
| POC: 5, | TL: 4, | [L0: 4 0] | [L1: 6 8] |
| POC: 7, | TL: 4, | [L0: 6 4] | [L1: 8 16] |
| POC: 12, | TL: 2, | [L0: 8 0] | [L1: 16 8] |
| POC: 10, | TL: 3, | [L0: 8 0] | [L1: 12 16] |
| POC: 9, | TL: 4, | [L0: 8 0] | [L1: 10 12] |
| POC: 11, | TL: 4, | [L0: 10 8] | [L1: 12 16] |
| POC: 14, | TL: 3, | [L0: 12 8] | [L1: 12 16] |
| POC: 13, | TL: 4, | [L0: 12 8] | [L1: 14 16] |
| POC: 15, | TL: 4, | [L0: 14 12] | [L1: 16 14] |

As shown in Table 3, POC 16, 8, 4, 2, 1, 12, 14 and 15 may have the same reference picture(s) in both lists. For example, POC 16 may have reference picture 0 in L0 and L1, and POC 8 may have reference picture 16 in L0 and L1. For bi-prediction, the same reference picture for L0 and L1 may be selected. A coding device (e.g., an encoder) may skip certain bi-prediction motion estimation if two reference pictures in bi-prediction are the same. In an example, a coding device (e.g., an encoder) may perform bi-prediction motion estimation for weight 4/8 and skip bi-prediction motion estimation for other weights, for example, if two reference pictures in bi-prediction are the same. In an example, the coding device may skip bi-prediction motion estimation for other weights when MVD precision is a certain value (e.g., 1-pel, 4-pel). The coding device may skip affine bi-prediction motion estimation for other weights when affine model is a four-parameter or a six-parameter model. Coding loss may be reduced.

Certain bi-prediction motion estimation may be bypassed under conditions associated with TL of the current picture. For example, a coding device may skip bi-prediction motion estimation for other weights when the TL is greater than a pre-defined threshold, such as one.

Any of the conditions herein for skipping bi-prediction search (e.g., for weights other than 4/8) may be combined. For example, the conditions herein to skip some weights may be implemented as an encoder approach to accelerate encoding.

The conditions herein to skip some weights may be implemented in a normative way. In an example, BCW with non-default weights may be allowed when MVD precision is 1/4-pel, and/or when the affine four-parameter mode is not used. BCW index signaling may be disabled when MVD precision is 1-pel or 4-pel. BCW index signaling may be disabled when affine four-parameter mode is used. Signaling overhead may be reduced.

BCW (e.g., GBi) may be disabled for some pictures, for example, depending on their TL and/or the QP used to encode the pictures. In examples, BCW may be more effective for low to medium QP values. BCW may be more effective for medium to high quality encoding. BCW may be disabled if the QP used to encode the current picture is above a threshold. BCW may be disabled for non-reference pictures (e.g., pictures at the highest TL). Non-reference pictures may not be used as reference pictures by other pictures.

BCW may be combined with BDOF, for example, for a current block or CU. In an example, a coding system may receive one or more indications that BCW and/or BDOF are enabled. The coding system may include a WTRU. The WTRU may use a combination of BCW and BDOF based on the one or more indications. The one or more indications may be signaled at the block and/or picture/slice level. For example, the WTRU may determine that BCW is enabled for a current CU. The WTRU may identify a weight indication of BCW for the current CU. The weight indication may indicate weights to be used for the current CU, for example, in BCW. An example of the weight indication may include a weight index. The WTRU may determine that BDOF is enabled for the current CU.

One or more of the following features may be applied for the interaction between bi-prediction with CU weights and BDOF. BDOF may include refining a motion vector associated with the current CU based at least in part on gradients associated with a location in the current CU.

BDOF may be performed if equal weights (e.g., 4/8 or 0.5) are to be used for the current CU in bi-prediction with CU weights. In an example, BDOF may be performed for the current CU if equal weights are to be used for the current CU and at least another condition is met. Another condition(s) may include, for example, that equal weights are applied to the L0 and L1 predictions and/or that the current CU is bi-predicted. In an example, the WTRU may further determine whether to perform BDOF for the current CU if the weight indication indicates that equal weights are to be used for the current CU in bi-prediction with CU weights based on one or more other conditions.

Figure 12:
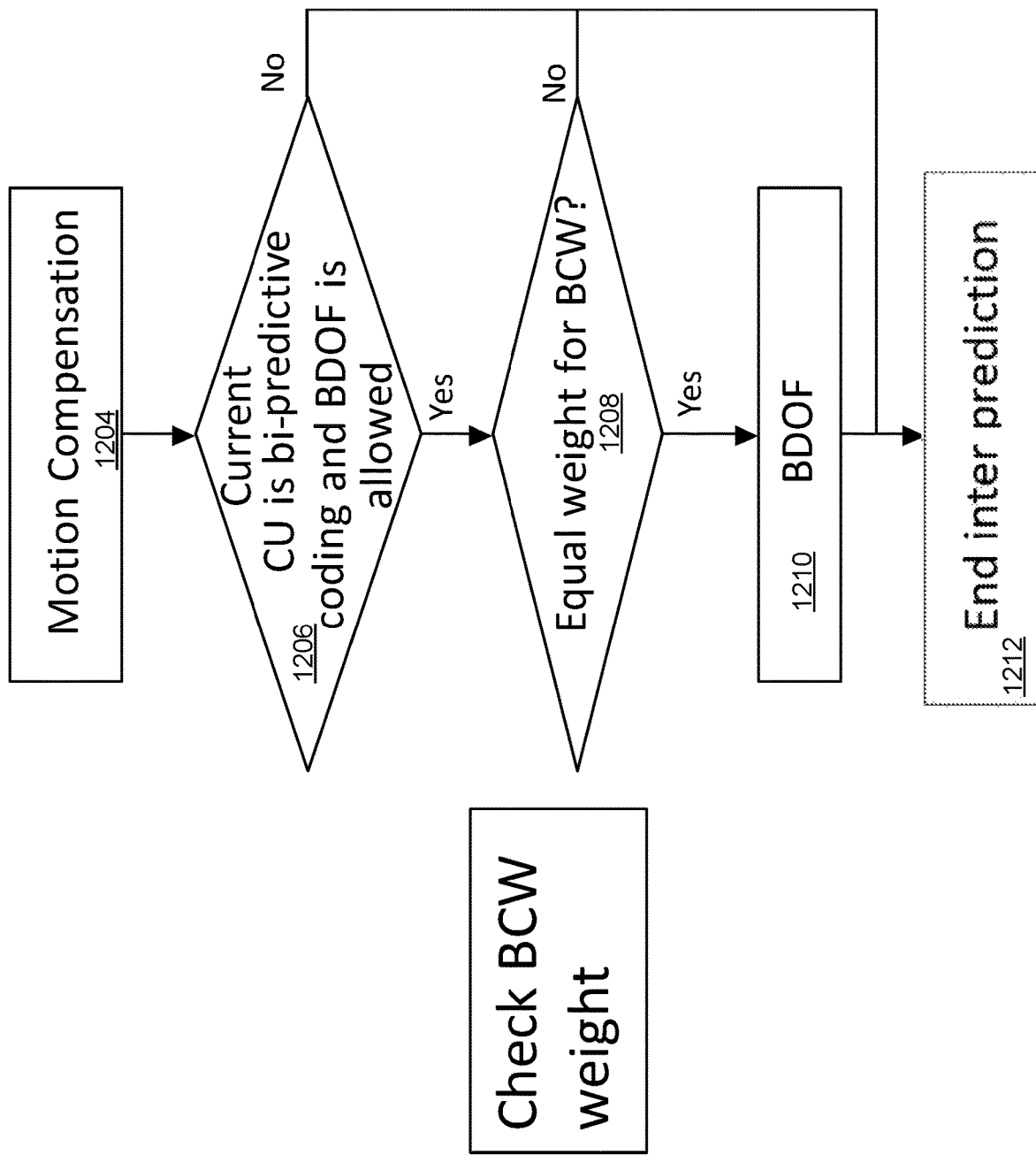
FIG. 12 is a diagram of an example for determining whether to bypass BDOF.

The decision on whether to apply BDOF to further refine the bi-prediction signal may be dependent on the weights that are applied. The WTRU may identify a weight indication of BCW for the current CU. The weight indication may indicate weights to be used for the current CU in BCW. FIG. 12 is a diagram of an example for determining whether to bypass BDOF. In an example, whether to bypass BDOF for the current CU may be determined based at least in part on the weight indication of BCW for the current CU. As shown in FIG. 12, motion compensation may be performed at 1204. Whether BCW is enabled for a current CU and whether BDOF is allowed may be determined at 1206. If it is determined that BCW is not enabled for a current CU or that BDOF is not allowed, checking the weights of bi-prediction with CU weights may be skipped and BDOF may not be performed. If it is determined that BCW is enabled for a current CU and that BDOF is allowed, weights of BCW may be checked, and whether equal weights are applied may be determined at 1208. If equal weights are applied, BDOF may be performed at 1210. As an example, if the weight indication indicates that equal weights are to be used for the current CU in BCW, BDOF may be performed for the current CU. In cases where unequal weight is applied, BDOF may be bypassed. As an example, if the weight indication indicates that unequal weights are to be used for the current CU in BCW, the WTRU may determine to bypass BDOF for the current CU. The weight indication may include an index value corresponding to a predetermined weight.

The current CU may be reconstructed based on the determination whether to bypass BDOF. The WTRU may be configured to perform BCW without BDOF based on the determination to bypass BDOF. For example, a first prediction CU weight may be determined based on the weight indication. A second prediction CU weight may be derived based on the first prediction CU weight and a constraint for BCW weights. BCW may be performed on the current CU based on the first prediction CU weight and the second prediction CU weight. As shown in FIG. 12, inter-prediction may end at 1212.

In an example, BDOF may be enabled regardless of whether equal weights or unequal weights are applied for a bi-predicted CU. Based on the optical flow model, the derivation of the refined motion vector of a sample (e.g., each sample) in the current CU may be kept the same as the BDOF derivation as described herein. The weighted combination of the original L0 and L1 prediction signals for BCW may be applied, for example, before BDOF is applied. The prediction signal obtained after the BDOF may be calculated as shown in the example of Eq. 18.

$$pred_{BIO}(x,y) = \frac{1}{2} \cdot \left< \begin{array}{c} (1-w_1) \cdot I^{(0)}(x,y) + w_1 \cdot I^{(1)}(x,y) + \\ \frac{v_x}{2}\left(\frac{\partial I^{(1)}(x,y)}{\partial x} - \frac{\partial I^{(0)}(x,y)}{\partial x}\right) + \\ \frac{v_y}{2}\left(\frac{\partial I^{(1)}(x,y)}{\partial y} - \frac{\partial I^{(0)}(x,y)}{\partial y}\right) \end{array} \right] \quad \text{Eq. 18}$$

In one or more examples described herein, the weights for BCW may be applied to the original L0 and L1 prediction signals while the derived motion refinements may be kept the same as original BDOF design. The corresponding weights that are applied to the motion refinements (e.g., $v_x$ and $v_y$) may not be accordant with that being applied to the original prediction signals.

The same weights for bi-prediction with CU weights may be applied to original bi-predictions and/or the motion refinements derived in L0 and L1. The motion refinements (e.g., $v_x$ and $v_y$) derivation may be the same as described herein. In examples, the prediction signal obtained after the BDOF may be calculated as shown in Eq. 19.

$$pred_{BIO}(x,y) = \frac{1}{2} \cdot \left[ \begin{array}{c} (1-w_1) \cdot I^{(0)}(x,y) + w_1 \cdot I^{(1)}(x,y) + \\ \frac{v_x}{2}\left(w_1\frac{\partial I^{(1)}(x,y)}{\partial x} - (1-w_1)\frac{\partial I^{(0)}(x,y)}{\partial x}\right) + \\ \frac{v_y}{2}\left(w_1\frac{\partial I^{(1)}(x,y)}{\partial y} - (1-w_1)\frac{\partial I^{(0)}(x,y)}{\partial y}\right) \end{array} \right] \quad \text{Eq. 19}$$

Although features and elements are described above in particular combinations, one of ordinary skill in the art will appreciate that each feature or element can be used alone or in any combination with the other features and elements. In addition, approaches described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. An apparatus for video processing, comprising:
    a processor configured to:
        determine that bi-directional optical flow (BDOF) is enabled;
        determine that bi-prediction with coding unit (CU) weights is enabled for a current coding block;
        identify a weight indication of bi-prediction with CU weights for the current coding block, wherein the weight indication indicates whether a first weight to be applied to a first prediction sample value for the current coding block in bi-prediction with CU weights is equal to a second weight to be applied to a second prediction sample value for the current coding block in bi-prediction with CU weights;
        determine whether to bypass BDOF for the current coding block based at least in part on the weight indication of bi-prediction with CU weights for the current coding block, wherein, based on a condition that the first weight to be applied to the first prediction sample value for the current coding block in bi-prediction with CU weights is not equal to the second weight to be applied to the second prediction sample value for the current coding block in bi-prediction with CU weights, BDOF is determined to be bypassed for the current coding block; and
        reconstruct the current coding block based on the determination of whether to bypass BDOF for the current coding block.

2. The apparatus of claim 1, wherein the processor is further configured to, based on a condition that the first weight to be applied to the first prediction sample value for the current coding block in bi-prediction with CU weights is equal to the second weight to be applied to the second prediction sample value for the current coding block in bi-prediction with CU weights, determine whether to perform BDOF for the current coding block based on at least another condition.

3. The apparatus of claim 1, wherein the weight indication of bi-prediction with CU weights for the current coding block comprises an index value corresponding to a predetermined weight.

4. The apparatus of claim 1, wherein the weight indication indicates that the first weight to be applied to the first prediction sample value in bi-prediction with CU weights is not equal to the second weight to be applied to the second prediction sample value for the current coding block in bi-prediction with CU weights, and the processor is further configured to:
  determine the first prediction CU weight to be applied to the first prediction sample value in bi-prediction with CU weights based on the weight indication;
  obtain the second weight based on the first weight and a constraint; and
  perform bi-prediction with CU weights on the current coding block based on the first weight and the second weight.

5. The apparatus of claim 1, wherein the weight indication indicates that the first weight to be applied to the first prediction sample value in bi-prediction with CU weights is equal to the second weight to be applied to the second prediction sample value for the current coding block in bi-prediction with CU weights, and the processor is further configured to determine to perform BDOF for the current coding block, wherein BDOF comprises refining a motion vector associated with the current coding block based at least in part on gradients associated with a location in the current coding block.

6. The apparatus of claim 1, wherein the processor is further configured to perform bi-prediction with CU weights without BDOF based on the determination to bypass BDOF, to reconstruct the current coding block.

7. A method for video processing, comprising:
  determining that bi-directional optical flow (BDOF) is enabled;
  determining that bi-prediction with coding unit (CU) weights is enabled for a current coding block;
  identifying a weight indication of bi-prediction with CU weights for the current coding block, wherein the weight indication indicates whether a first weight to be applied to a first prediction sample value for the current coding block in bi-prediction with CU weights is equal to a second weight to be applied to a second prediction sample value for the current coding block in bi-prediction with CU weights;
  determining whether to bypass BDOF for the current coding block based at least in part on the weight indication of bi-prediction with CU weights for the current coding block, wherein, based on a condition that the first weight to be applied to the first prediction sample value for the current coding block in bi-prediction with CU weights is not equal to the second weight to be applied to the second prediction sample value for the current coding block in bi-prediction with CU weights, BDOF is determined to be bypassed for the current coding block; and
  reconstructing the current coding block based on the determination of whether to bypass BDOF for the current coding block.

8. The method of claim 7, further comprising, based on a condition that the first weight to be applied to the first prediction sample value for the current coding block in bi-prediction with CU weights is equal to the second weight to be applied to the second prediction sample value for the current coding block in bi-prediction with CU weights, determining whether to perform BDOF for the current coding block based on at least another condition.

9. The method of claim 7, wherein the weight indication of bi-prediction with CU weights for the current coding block comprises an index value corresponding to a predetermined weight.

10. The method of claim 7, wherein the weight indication indicates that the first weight to be applied to the first prediction sample value in bi-prediction with CU weights is not equal to the second weight to be applied to the second prediction sample value for the current coding block in bi-prediction with CU weights, the method further comprising:
  determining the first weight to be applied to the first prediction sample value in bi-prediction with CU weights based on the weight indication;
  obtaining the second weight based on the first weight and a constraint; and
  performing bi-prediction with CU weights on the current coding block based on the first weight and the second weight.

11. The method of claim 7, wherein the weight indication indicates that the first weight to be applied to the first prediction sample value in bi-prediction with CU weights is equal to the second weight to be applied to the second prediction sample value for the current coding block in bi-prediction with CU weights, and the method further comprises determining to perform BDOF for the current coding block, wherein BDOF comprises refining a motion vector associated with the current coding block based at least in part on gradients associated with a location in the current coding block.

12. An apparatus for video processing, comprising:
  a processor configured to:
    determine that bi-directional optical flow (BDOF) is enabled;
    determine that bi-prediction with coding unit (CU) weights is enabled for a current coding block;
    generate a weight indication of bi-prediction with CU weights for the current coding block, wherein the weight indication indicates whether a first weight to be applied to a first prediction sample value for the current coding block in bi-prediction with CU weights is equal to a second weight to be applied to a second prediction sample value for the current coding block in bi-prediction with CU weights;
    determine whether to bypass BDOF for the current coding block based at least in part on the weight indication of bi-prediction with CU weights for the current coding block, wherein, based on a condition that the first weight to be applied to the first prediction sample value for the current coding block in bi-prediction with CU weights is not equal to the second weight to be applied to the second prediction sample value for the current coding block in bi-prediction with CU weights, BDOF is determined to be bypassed for the current coding block;
    generate residual based on the determination of whether to bypass BDOF; and
    send the residual and the weight indication of bi-prediction with CU weights.

13. The apparatus of claim 12, wherein the processor is further configured to, based on a condition that the first weight to be applied to the first prediction sample value for the current coding block in bi-prediction with CU weights is equal to the second weight to be applied to the second prediction sample value for the current coding block in bi-prediction with CU weights, determine whether to perform BDOF for the current coding block based on at least another condition.

14. The apparatus of claim 12, wherein the weight indication of bi-prediction with CU weights for the current coding block comprises an index value corresponding to a predetermined weight.

15. The apparatus of claim 12, wherein the weight indication indicates that the first weight to be applied to the first prediction sample value in bi-prediction with CU weights is not equal to the second weight to be applied to the second prediction sample value for the current coding block in bi-prediction with CU weights, and the processor is further configured to:
- determine the first weight to be applied to the first prediction sample value in bi-prediction with CU weights based on the weight indication;
- obtain the second weight based on the first weight and a constraint; and
- perform bi-prediction with CU weights on the current coding block based on the first weight and the second weight.

16. A method for video processing, comprising:
- determining that bi-directional optical flow (BDOF) is enabled;
- determining that bi-prediction with coding unit (CU) weights is enabled for a current coding block;
- generating a weight indication of bi-prediction with CU weights for the current coding block, wherein the weight indication indicates whether a first weight to be applied to a first prediction sample value for the current coding block in bi-prediction with CU weights is equal to a second weight to be applied to a second prediction sample value for the current coding block in bi-prediction with CU weights;
- determining whether to bypass BDOF for the current coding block based at least in part on the weight indication of bi-prediction with CU weights for the current coding block, wherein, based on a condition that the first weight to be applied to the first prediction sample value for the current coding block in bi-prediction with CU weights is not equal to the second weight to be applied to the second prediction sample value for the current coding block in bi-prediction with CU weights, BDOF is determined to be bypassed for the current coding block;
- generating residual based on the determination of whether to bypass BDOF; and
- sending the residual and the weight indication of bi-prediction with CU weights.

17. The method of claim 16, further comprising, based on a condition that the first weight to be applied to the first prediction sample value for the current coding block in bi-prediction with CU weights is equal to the second weight to be applied to the second prediction sample value for the current coding block in bi-prediction with CU weights, determining whether to perform BDOF for the current coding block based on at least another condition.

18. The method of claim 16, wherein the weight indication indicates that the first weight to be applied to the first prediction sample value in bi-prediction with CU weights is equal to the second weight to be applied to the second prediction sample value for the current coding block in bi-prediction with CU weights, and the method further comprises determining to perform BDOF for the current coding block, wherein BDOF comprises refining a motion vector associated with the current coding block based at least in part on gradients associated with a location in the current coding block.

19. The apparatus of claim 1, wherein the first prediction sample value is associated with a first reference picture, and the second prediction sample value is associated with a second reference picture, wherein the first reference picture and first reference picture are different.

20. A computer-readable medium including instructions, which, when executed by one or more processors, cause the one or more processors to perform the method of claim 7.

* * * * *